United States Patent [19]

Hogberg et al.

[11] 3,869,527

[45] *Mar. 4, 1975

[54] SECONDARY PHOSPHATE ESTERS

[75] Inventors: Bertil Hogberg; Hans Fex; Torsten Perklev; Sten Veige, all of Helsingborg; Bo Fredholm, Nyhamnslage, all of Sweden

[73] Assignee: Aktiebolaget Leo, Halsovagen, Helsingborg, Sweden

[ * ] Notice: The portion of the term of this patent subsequent to Jan. 21, 1992, has been disclaimed.

[22] Filed: Aug. 14, 1972

[21] Appl. No.: 280,538

[30] Foreign Application Priority Data
Aug. 17, 1971   Great Britain .......................... 38577
Jan. 31, 1972   Great Britain ........................... 4511

[52] U.S. Cl. .......... 260/946, 260/247.7 L, 260/413, 260/930, 260/940, 260/941, 260/942, 260/943, 260/944, 260/945, 424/199, 424/204, 424/211, 424/212, 424/214

[51] Int. Cl. ............................ C07f 9/18, A01n 9/36

[58] Field of Search ..................... 260/946, 247.7 L

[56] References Cited
UNITED STATES PATENTS
2,465,320   3/1949   Bergel et al. ........................ 260/946

*Primary Examiner*—Anton H. Sutto
*Attorney, Agent, or Firm*—Gordon W. Hueschen

[57] ABSTRACT

This invention relates to novel secondary phosphoric acid esters and salts thereof, having valuable pharmacological properties, and to the preparation thereof. The invention is also concerned with pharmaceutical compositions containing the said compounds, and methods of treatment therewith.

18 Claims, No Drawings

SECONDARY PHOSPHATE ESTERS

The esters are i.a. useful as selective inhibitors of prostaglandins and of Slow Reacting Substances (SRS). They also inhibit the formation of adenosine 3',5'-monophosphate (cyclic AMP).

In addition the esters of this invention also exert intrinsic smooth muscle stimulatory activity.

The present invention relates to novel secondary phosphoric acid esters and salts thereof, having valuable pharmacological properties, as well as processes for the preparation thereof. The invention is also concerned with pharmaceutical compositions containing the said compounds, and methods of treatment therewith.

The compounds have all strong activity as selective inhibitors of prostaglandins or of compounds with structures related to the naturally occurring prostaglandins and having the same type of activities as these. They also selectively antagonize the Slow Reacting Substance (SRS), an unsaturated hydroxy-acid of lipid nature related to the prostaglandins and inhibit the formation of adenosine 3', 5'-monophosphate (cyclic AMP), a key component of the cellular response to extracellular events, which is interrelated to the action of prostaglandin.

Like many substances with receptor blocking properties, e.g. certain adrenergic $\beta$-blocking agents, the compounds of this invention also exert intrinsic in this case smooth muscle stimulatory activity.

These esters are also useful as surface active agents and as agents in extractions of cations due to the presence of both hydrophilic and lipophilic groups in the same molecule. They also exert corrosion-inhibitory effects.

BACKGROUND OF THE INVENTION

The prostaglandins (in the following abbreviated as PG:s) are a new group of biologically active substances affecting many important physiological processes largely by influencing intracellular metabolism. See e.g. E. W. Horton in "Prostaglandins" (Monographs, Endocrinology, Vol. 7, 1972; Springer-Verlag).

The basic chemical structure of the PG:s is a $C_{20}$ fatty acid, prostanoic acid, containing a five-membered ring.

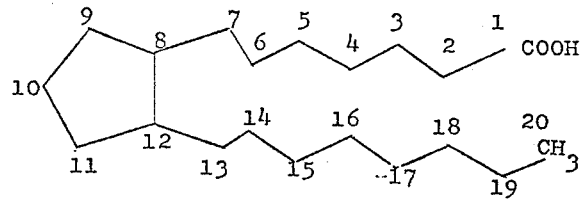

Depending on the substituents in the five-membered ring four different abbreviations are used in the literature.

All E-types PG:s have $11\alpha$-hydroxy and 9-keto groups in the cyclopentane ring. In the F-types the 9-keto group is reduced to a ($\alpha$ or $\beta$) hydroxyl group. All the "primary" PG:s contain a 13:14 trans double bond. $E_1$ and $F_1$ compounds have only this one double bond the $E_2$ and $F_2$ molecules have an additional 5:6 cis double bond and the $E_3$ and $F_3$ a further cis double bond between 17 and 18. All naturally occurring PG:s found today have a 15(S)-hydroxy group. $9\alpha$, $11\alpha$, 15(S)-tri hydroxy-5-cis, 13-transprostadienoic acid has for example, been called prostaglandin $F_{2\alpha}$ and further abbreviated as $PGF_{2\alpha}$.

Details about the chemistry of the PG:s are found, e.g. in a review by P. W. Ramwell et al., in "Progress in the chemistry of fats and other lipids" vol. IX, p. 231.

It is also known that compounds with a structure related to the naturally occurring PG:s can have similar effects. See e.g. P. W. Ramwell et al., Nature 221 (1969) 1251, W. Lippman, J. Pharm. Pharmacol. 22 (1970) 65, J. Fried et al., J. Am. Chem. Soc. 97 (1971) 7319 and N. S. Crossley, Tetrahedron Letters (1971), 3327.

Evidence that PG:s are involved in a large number of physiological and pathological processes is rapidly accumulating. Two major areas, where these compounds play an important physiological role, are the control of fertility and the regulation of blood flow. Further, the PG:s have potent pharmacological actions on smooth muscle in various other organs such as the gastrointestinal and the respiratory tracts. They are also involved in the events following nerve stimulation, both centrally and in the periphery, as well as in the process of lipolysis. There are also indications that PG:s play an important role in different ophthalmologic disorders.

In the area of reproduction PG:s are involved in several ways. It is known, for instance, that sufficient amounts of PG:s to affect the female genital-tract smooth muscles are delivered with the semen and thereby probably promote conception. At full term the levels of PG:s in plasma and amniotic fluid are increased which in turn initiates the onset of labour. This latter effect of PG:s is presently being used therapeutically.

The circulatory effects of PG:s are as a rule vasodepressive, although PGF in some instances may cause a rise of the blood-pressure. The way in which PG:s normally contribute to blood-flow regulation has not yet been elucidated.

In the gastrointestinal tract PG:s generally cause contraction of the smooth muscle. Certain kinds of diarrhoea are believed to be caused by high plasma levels of PG:s. In the lungs PGF causes bronchoconstriction, while PGE has the opposite effect. At nerve stimulation PG:s are released and, at least in peripheral nerves, seems to counteract the result of the stimullation.

The effects of PG:s are generally obtained with very small amounts of the compounds, and this observation,

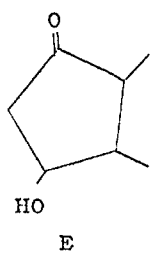

E

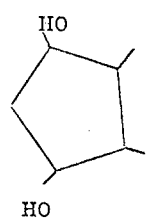

F

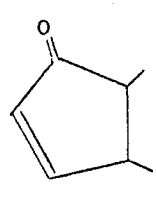

A

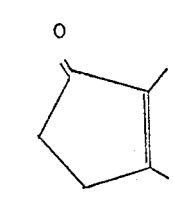

B together with the fact that PG:s are widely distributed in the organism point to an important role of these compounds in homeostatic mechanisms. However, although so many important pharmacological effects of PG:s are known, the exact nature of their physiological involvements is poorly understood. This is in part due to the fact that no suitable inhibitory compound has so far been available.

Having very pronounced physiological and pharmacological effects the PG:s could safely be anticipated also to play an important role in pathological conditions. Accordingly, there is now rapidly growing evidence for this, a fact that further emphasizes the need for prostaglandin-inhibitory agents. Thus, PG:s are involved in inflammatory processes of various kinds, such as burns, contact dermatitis and anaphylactic reactions. In these cases PG:s have been suggested to be mediators of the reaction. One important condition, for example, in which PG:s are considered to be of ethiological significance, is bronchial asthma. In this connection it is of interest to mention that a substance, chemically and pharmacologically closely related to the prostaglandins, namely Slow Reacting Substance (SRS, Cf. Strandberg, K. and Uvnas, B. In Acta Physiol. Scand. 82 (1971) p. 358), is also produced during anaphylaxis, e.g. in bronchial asthma. A possibility to counteract the effect of this substance is thus also highly desirable.

Against the background of the above information it is evident that major therapeutic advances may result from the use of prostaglandin-inhibitory substances. Inhibition of various inflammatory reactions, improvement of bronchial asthma, regulation of blood-flow, control of gastrointestinal hypermotility are a few examples of expected therapeutic effects of such compounds. With increasing knowledge about the functions of PG:s the usefulness of inhibitors therefore will no doubt become still more apparent. Not only will conditions characterized by an excessive formation of PG:s be improved, but it is also possible to influence certain normal physiological processes when so desired, such as for example the conception.

Therapeutic advances may further result from administering esters of this invention before, at the same time or after the administration of PG:s in order to prevent side-effects caused by the PG:s, e.g. diarrhoea, nausea, vomiting, local tissue reactions and pyrexia.

The expression "prostaglandins" (PG:s) as used in this disclosure is intended to cover prostaglandins and related structures as indicated above of natural as well as synthetic origin.

In addition the esters of this invention exert an inhibitory action on the hormone stimulated formation of adenosine 3',5'-monophosphate (cyclic AMP). Cyclic AMP is formed from adenosine 5'-triphosphoric acid (ATP) by the action of adenyl cyclase, an enzyme system contained in the plasma membrane. The hormones influence this enzyme complex and thereby the intracellular concentration of cyclic AMP. The cells respond to the changes in cyclic AMP levels with whatever mechanism the different cells have available. It seems likely that compounds which influence the formation of cyclic AMP will be of therapeutic value, when increasing knowledge about the cellular dysfunction at different pathological conditions will be available. See e.g. G.A. Robinson et al. in "Cyclic AMP", Academic Press, 1971.

Some antagonists of prostaglandins have already been described. J. Fried et. al., Nature 223 (1969) 208, found that 7-oxa-prostaglandin-like compounds with 6-membered rings inhibited prostaglandin $E_1$ ($PGE_1$).

A derivative of dibenzoxazepine was found to antagonize $PGE_2$ (J. H. Sanner in Arch. int. Pharmacodyn. 180 (1969) 46.)

A high molecular weight polyester between phloretin and phosphoric acid was also found to have a prostaglandin-blocking activity (K.E. Eakins et al. Brit. J. Pharmac. 39 (1970) 556), and in addition to be an antagonist of Slow Reacting Substance (SRS) (Mathé, A. A., and Strandberg, K. in Acta physiol. scand. 82 (1971) 460).

This polymer, polyphoretin phosphate, was already described by E. Diczfalusy et al. in Acta Chem. Scand. 7 (1953) 913, as a cross-linked high molecular weight enzyme inhibitor. It has an average molecular weight of 15,000, did not dialyze through a cellophane membrane, and was found to be a strong inhibitor of various enzymes e.g. hyaluronidase and alkaline phosphatase.

These materials are complex mixtures of various different polymeric structures in varying proportions (due to the inability to control either the degree of polymerisation or selectively induce such polymerisation at specific reactions sites in view of the availability of numerous possible sites at which polymerisation can occur) and the activity which has been attributed thereto could not be attributed to any specific polymeric structure, much less any specific molecular weight fraction of any certain structures or units thereof, either in theory or in practice, in which latter aspect positive identification of specific active components of the complex polymeric mixture has been impossible.

It has now, surprisingly, been found that certain simple synthetic secondary phosphoric acid esters of the structures shown below are very good selective inhibitors of PG:s and compounds with prostaglandin activities and that they also selectively antagonize the Slow Reacting Substance (SRS). These effects are shown in examples Nos. 18–22.

From the results obtained in these examples it is obvious that the compounds of this invention are useful when it is desired to inhibit the effects caused by various PG:s and also of the effect of SRS.

Example No 23 shows that the compounds also can prevent or reduce an anaphylactic bronchoconstriction.

The inhibitory effect of esters of this invention on the formation of cyclic AMP is described in example No. 24.

This example shows the usefulness of the compounds to prevent the formation of cyclic AMP and thus improve a condition where an excessive formation of that compound occurs.

In addition the esters of this invention exert a smooth muscle stimulatory activity as demonstrated in examples Nos. 25–27.

Since the compounds of the invention are produced synthetically, they have a definitive structure and are of course substantially free of inactive or lesser active impurities and maaterials of similar and/or indefinite composition and structure.

In the types of experiments described by Eakins et al. (ibid.) and by Perklev & Ahrén (Life Sciences Part I, 10 (1971) 1387) most of the compounds of this invention are much stronger inhibitors against prostaglandins, e.g. $E_1$($PGE_1$), $E_2$ ($PGE_2$), $F_{1\alpha}$ ($PGF_{1\alpha}$) and $F_{2\alpha}$ ($PGF_{2\alpha}$) than polyphloretin phosphate and they are also superior as antagonists for Slow Reacting Substance (SRS) in the types of experiments described by Mathe and Strandberg (ibid.). In addition the secondary phosphoric acid esters of this invention have no such antienzymatic properties as those described for this cross-linked high molecular weight polymer.

SUMMARY OF THE INVENTION

Accordingly, one object of the invention is to provide new compounds possessing activity as selective inhibitors of prostaglandins and compounds with prostaglandin activities.

Another object of the invention is to provide new compounds possessing activity as selective inhibitors of the Slow Reacting Substances(SRS).

A further object of the invention is to provide new compounds possessing activity as inhibitors of the formation of adenosine 3',5'-monophosphate (cyclic AMP).

Still another object of the invention is to provide new compounds having a smooth muscle stimulatory effect.

Another object of the invention is to provide processes for preparing the new compounds.

A further object of the invention is to provide a method of treating a living animal body to produce a prostaglandin inhibitory effect.

Yet another object of the invention is to provide a method of treating a living animal body to produce an antagonizing effect of the Slow Reacting Substance (SRS).

Still another object of the invention is to provide a method of treating a living animal body to produce an inhibition of the formation of adenosine 3',5'-monophosphate (cyclic AMP).

Yet another object of the invention is to provide a method of treating a living animal body to produce a smooth muscle stimulatory effect.

A further object of the invention is to provide compositions containing as an active ingredient one or more of the new compounds preferably together with a pharmaceutically acceptable carrier and, if desired, other pharmacologically active agents.

According to the invention there are provided novel compounds having the general formula:

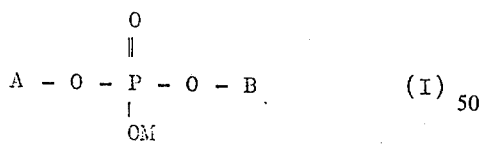

(I)

wherein M is selected from the group consisting of hydrogen and a pharmaceutically acceptable inorganic and organic cation, and
wherein A and B, independent of each other, are:

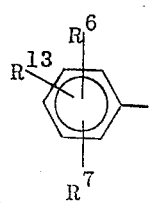

wherein one and only one of the substituents $R^6$, $R^7$, and $R^{13}$ always represents a group R, located in any of the meta and para positions relative to the phosphoric acid ester group, the group R having the formula:

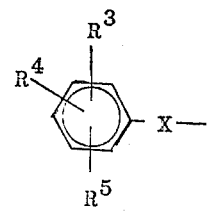

wherein X is selected from the group consisting of:

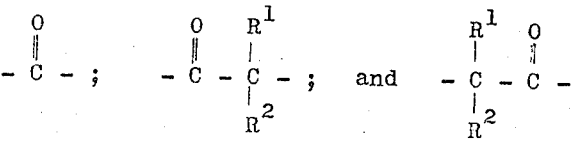

The keto-group of X may also be in the form of a ketal of a lower aliphatic alcohol;
wherein $R^1$ and $R^2$ are selected from the group consisting of:
  hydrogen; lower alkyl; and lower alkenyl;
wherein if $R^1$ is hydrogen $R^2$ may further be selected from the group consisting of:
  lower alkoxy; hydroxy: —O—CO—$R^{14}$; cyclopentyl; cyclohexyl; phenyl; and phenyl substituted in m- or p-position by one substituent selected from the group consisting of lower alkyl, lower alkoxy, —F, —Cl, —Br, and —$CF_3$;
wherein $R^3$, $R^4$, $R^5$, $R^6$, $R^7$, and $R^{13}$ above are selected from the group consisting of:
  hydrogen; lower alkyl; lower alkenyl; lower alkoxy; hydroxy; —O—CO—$R^{14}$;

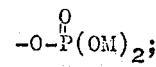

—F; —Cl; —Br; —$CF_3$; —CN; —$NO_2$; —$COOR^9$; —$CH_2COOR^9$; —$OCH_2COOR^9$; —CO—$R^{14}$; —$CONR_2^8$; —$CH_2CONR_2^8$; —$OCH_2CONR_2^8$; —$NR_2^8$; —$NR^8$ —CO—$R^{14}$; —$CH_2NR_2^8$; and —$CH_2NR^8$—CO—$R^{14}$;
with the proviso that always one and only one of the substituents $R^6$, $R^7$, and $R^{13}$ is R;
wherein $R^8$ is selected from the group consisting of hydrogen and lower alkyl;
wherein $R^9$ is selected from the group consisting of lower alkyl and M, where M has the above meaning; and
wherein $R^{14}$ is lower alkyl.

In this disclosure the structural presentation of a substituted benzene nucleus as per the basic formula:

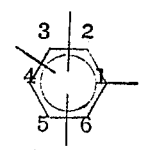

is intended to cover all possible variants with regard to the positions of the three nonfixed substituents, i.e.

2,3,4-, 2,3,5-, 2,3,6-, 2,4,5-, 2,4,6-, and 3,4,5-substitution.

In this disclosure the expression "lower" means that the group referred to contains one to four carbon atoms, inclusive. Thus lower alkyl, lower alkenyl and lower alkoxy include for instance: methyl, ethyl, propyl, iso-propyl, butyl, secondary butyl, isobutyl, tertiary butyl, vinyl, iso-propenyl, 1-propenyl, allyl, methoxy, ethoxy, propoxy, isopropoxy, butoxy, iso-butoxy, secondary butoxy and tertiary butoxy.

Among pharmaceutically acceptable inorganic and organic cation under the definition of M above, thus derived from the following metals and amines may be mentioned:

metals: calcium, potassium, and sodium;
amines: monoethanolamine, diethanolamine, dimethylaminoethanol, N-methylglucamine, trishydroxymethylmethylamine, morpholine, and the like.

Among the compounds covered by the above general formula (I) those, wherein A is the same as B are preferred. When considering below the classes of preferred compounds only such compounds wherein A is the same as B, i.e. symmetrical phosphoric acid esters of the invention, are referred to.

If the substituents $R^3$, $R^4$, $R^5$, $R^6$, $R^7$, and $R^{13}$, except the one being R, are all hydrogen, it is preferred that at least one of the substituents $R^1$ and $R^2$ is different from hydrogen.

With regard to substituents $R^3$, $R^4$, $R^5$, $R^6$, $R^7$, and $R^{13}$, it is preferred that at least one of said substituents is hydrogen. It is also preferred that at least one of said substituents is hydrogen. It is also preferred that at least one of said substituents, in addition to the one being R, is different from hydrogen.

Preferred compounds are obtained if $R^1$ and $R^2$ both are hydrogen or one of said substituents is selected from the group consisting of lower alkyl, and lower alkenyl.

If selected from the group consisting of —COOR⁹, —CH₂COOR⁹, —OCH₂COOR⁹, —CONR₂⁸, —CH₂CONR₂⁸, —OCH₂CONR₂⁸, —NR₂⁸, —NR⁸—CO—R¹⁴, —CH₂NR₂⁸, and —CH₂NR⁸—CO—R¹⁴, preferably only one of substituents $R^3$, $R^3$, $R^4$, $R^5$, $R^6$, $R^7$, and $R^{13}$ constitutes a substituent from said group.

Another group of preferred compounds are those wherein the substituents $R^3$, $R^4$, $R^5$, $R^6$, $R^7$, and $R^{13}$, except the one being R, are selected from the group consisting of hydrogen, lower alkyl, lower alkoxy, hydroxy, —O—CO—R¹⁴,

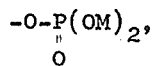

—F, —Cl, and —CF₃.

It is preferred that at most one of the substituents $R^3$, $R^4$, $R^5$, $R^6$, $R^7$, and $R^{13}$ consists of the group

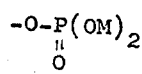

and that said group, which confers water solubility to the compounds hereby obtained, preferably is positioned in R and in m- or p-position relative to X.

If selected from the group consisting of —F, —Cl, and —CF₃, preferably at most one of substituents $R^3$, $R^4$, $R^5$, $R^6$, $R^7$, and $R^{13}$ constitutes a substituent from said group.

When one of the substituents $R^3$, $R^4$, $R^5$, $R^6$, $R^7$, and $R^{13}$ is selected from the group consisting of lower alkoxy, hydroxy, and —O—CO—R¹⁴, the preferred position of such substituent is in one of the o-positions relative to the keto group of X.

Another group of preferred compounds are those wherein the keto group of X is attached to the benzene nucleus of R.

Preferred compounds are also obtained when at least two of the substituents $R^3$, $R^4$, $R^5$, $R^6$, $R^7$, and $R^{13}$ are selected from the group consisting of lower alkyl, lower alkoxy, hydroxy, and —O—CO—R¹⁴.

Another group of preferred compounds are those wherein at least two of the substituents $R^3$, $R^4$ and $R^5$ are selected from the group consisting of lower alkoxy, hydroxy, and —O—CO—R¹⁴ and, the third substituent, if not selected from the said group, is selected from the group consisting of hydrogen and lower alkyl; and wherein the substituents $R^6$, $R^7$ and $R^{13}$, except the one being R, are selected from the group consisting of hydrogen, lower alkyl, and lower alkoxy.

PREPARATION OF COMPOUNDS HAVING THE FORMULA (I) ABOVE.

The compounds having the above formula (I) may be prepared by methods known per se, see for instance Houben Weyl. Methoden der organischen Chemie, IV Ed. Vol. XII/2, p. 226, and the heading "Phosphorylation" by D. M. Brown, p. 75, in "Advances in Organic Chemistry" Vol. 3, Interscience Publishers, 1963.

Among such methods for instance the following are useful:

a. A compound having the formula A—OH i.e.

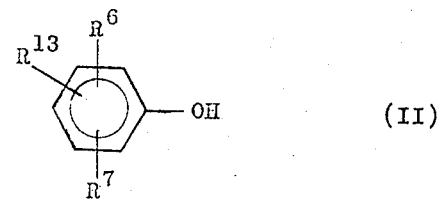

(II)

having only one free hydroxy group is allowed to react with about 0.5 mole of phosphorus oxychloride, suitably in the presence of a tertiary amine, for instance pyridine. After the esterification unreacted chlorine atoms are hydrolyzed with water and the symmetric secondary phosphoric acid ester obtained corresponding to the above formula (I) is isolated from the reaction mixture in the form of a free acid or as a suitable salt thereof.

If only 0.3–0.4 mole of phosphorus oxychloride is used a great number of corresponding tertiary phosphoric acid ester may also be formed. Such esters can be hydrolyzed, for instance with alkali, to give the desired symmetric secondary phosphoric acid esters corresponding to the formula (I) above.

b. A compound having the formula (II) above and containing only one free hydroxy group is allowed to react with 0.5 mole of trichloroethyl phosphorodichloridate, Cl₃CCH₂OP(O)Cl₂, in the presence of at least one mole of a tertiary amine, e.g. pyridine. When

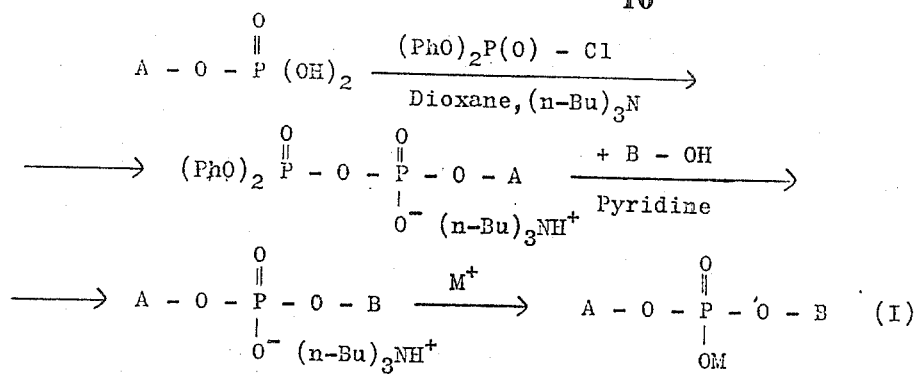

both chlorine atoms of said chloridate have reacted the tertiary phosphoric acid obtained is treated with for instance Zn in pyridine-acetic acid in Zn/Cu in dimethylformamide to remove the trichloroethyl ester group resulting in a symmetric secondary phosphoric acid ester having the formula (I) above.

c. A compound of the formula II containing only one free hydroxy group is allowed to react with 0.5 mole of methylphosphoramidic dichloride in an inert organic solvent, for instance benzene, and in the presence of at least one mole of a tertiary amine, for instance triethylamine. The reaction may also be carried out using a suitable amine, for instance pyridine, as solvent. The bis-II N-methylphosphoramidate obtained is then hydrolyzed in an acidic solution, e.g. containing formic acid or sulfuric acid, giving a symmetrical secondary phosphoric acid ester having formula (I) above.

d. A primary phosphoric acid ester derived from a compound having the formula (II) thus having the general formula:

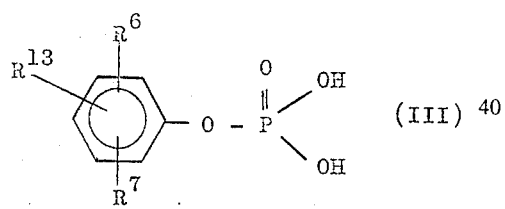

is allowed to react in an activated form with about one mole of a compound having formula B—CH. This reaction may for instance be carried out in the presence of about two moles of 2,4,6-triisopropylbenzenesulphonyl chloride and about two moles of a tertiary amine, e.g. triethylamine, using a suitable solvent, for instance pyridine. After the condensation has been completed water is added making it possible to isolate the secondary phosphoric acid having the formula (I) above.

With this type of reaction it is possible to prepare both symmetrical and unsymmetrical secondary phosphoric acid esters. Methods for the preparation of the primary phosphoric acid esters having the formula (III) are e.g. found in the first reference given above, p. 143, and in the second one.

e. The compounds having formula (I) above may also be prepared by the method described by J. Reiss in Bull. Soc. Chim, France 1965, p. 29 from a primary phosphoric acid ester of A—OH, i.e. having the formula (III) above, according to the reaction steps shown below:

f. The compounds having formula (I) of the invention may also be prepared by using 2-chloromethyl-4-nitrophenyl phosphorodichloridate in the reaction steps shown below.

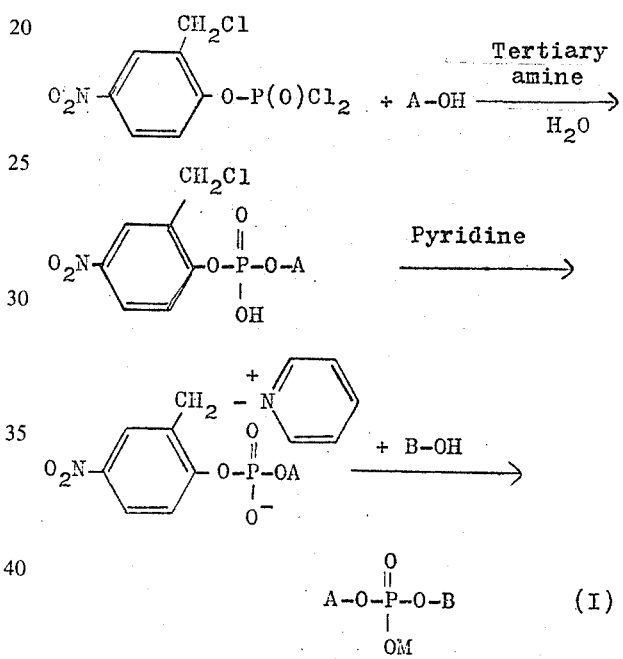

Using at least 2 moles of A—OH in the first step and in the presence of 2 moles of a tertiary amine, a tertiary phosphate ester is obtained in this step which then can be transferred over the quarternary pyridinium compound to a symmetrical secondary phosphoric acid ester having the formula (I) above.

g. The compounds having formula (I) above may also be prepared by hydrolyzing diphosphoric acid tetraesters, prepared in a manner known per se, for instance according to the schematic reaction sequence indicated below (B=A).

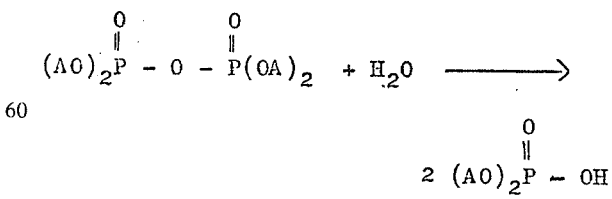

h. The compounds having formula (I) above may also be prepared by converting, in a manner known per se, derivatives thereof, for instance tertiary esters with a lower aliphatic alcohol, a phosphoric acid diester amide or a phosphoric acid diester halogenide, to secondary phosphoric acid esters of formula (I). This may be illustrated by the following reaction formulas, wherein A and B have the above meaning.

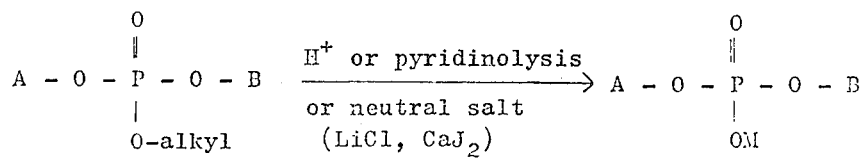

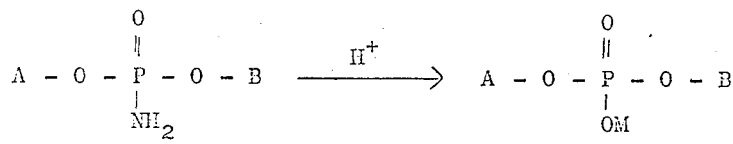

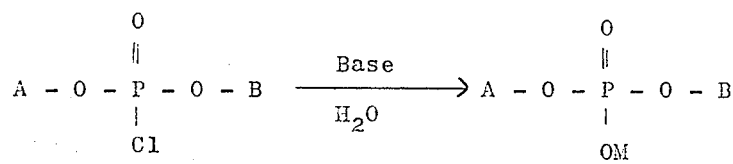

i. The compounds having the formula (I) may also be prepared according to Houben-Hoesch reaction (Friedel-Craft and Related Reactions III, 383, Interscience, New York, 1964) by reacting a compound

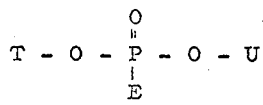

wherein T and U, independent of each other, are

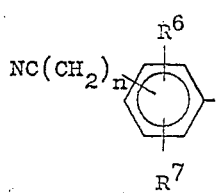

wherein $R^6$ and $R^7$ are different from R and n=0 or 1; and wherein E is or by conventional methods can be transformed to $-OM$; with a compound

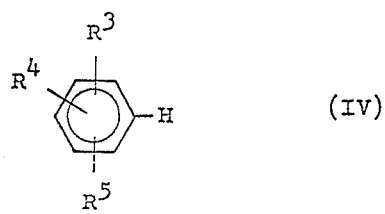

in which at least two of the substituents $R^3$, $R^4$ and $R^5$ are selected from $-OH$ and $-OCH_3$ and located in m-position to each other, under formation of a compound (I) in which X is

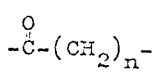

and $R^3$, $R^4$ and $R^5$ are the same as in the compound (IV) used.

j. The compounds having the formula (I) may also be prepared according to the schematic reaction indicated below.

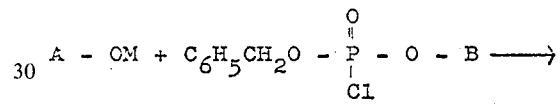

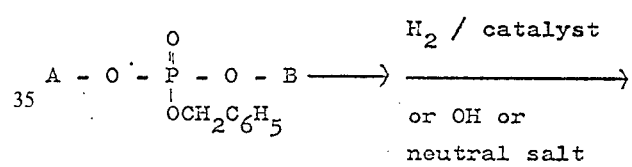

k. It is also possible to prepare the compounds having formula (I) according to the present invention by first preparing a secondary phosphoric acid ester, wherein one or several of the substituents $R^1$, $R^2$, $R^3$, $R^4$, $R^5$, $R^6$, $R^7$, $R^8$, $R^9$, $R^{13}$, $R^{14}$ consists of other groups than those desired, and then converting such groups in a manner known per se into the groups defined by the general formula (I).

As examples of such transformations, besides that mentioned in i above, the removing of protecting groups, e.g. benzyl-, trityl-, methoxymethyl-, tetrahydropyranyl-, trimethylsilyl-, carboalkoxy-, carbobenzoxy-, and benzoyl groups, may be mentioned.

l. It is also possible in a manner known per se to prepare compounds having the general formula (I) from other compounds within the definition of the general formula (I).

As examples of such transformations the following methods may be mentioned: Free hydroxyl groups are e.g. obtained by removal of acyl- and dihydroxyphosphinyl groups from acyl esters and primary phosphoric acid esters, respectively, by removal of lower alkyl groups from lower alkoxy groups, and via diazonium salts from primary aromatic amines. Free groups are e.g. obtained by removal of acyl groups in acylamides, by reduction of nitro-, nitrile- and amide groups. Free carboxylic acid groups are e.g. obtained by hydrolysis of ester-, amide- and nitrile groups. On the other hand free hydroxy groups can be esterified and etherified, primary and secondary amines acylated to amides, and carboxylic acids esterified and also transformed to amides. By Mannich reaction it is possible to insert aminomethyl groups, and by Schiemann and Sandmayer reactions primary aromatic amines can be converted to fluor-, chloride- or nitrole groups.

As far as the group X is concerned examples of transformations which can be done within this group are found below when the methods to prepare A—OH, i.e. (II), are exemplified.

m. If the secondary phosphoric acid esters having the above formula (I) are isolated in the form of free acids, such acids can be transferred to salts with pharmaceutically acceptable inorganic or organic cations in a conventional way. Examples of suitable inorganic and organic cations are found above.

When a secondary phosphoric acid ester according to this invention is isolated in the form of a salt with a cation, which is not pharmaceutically acceptable, such salt is transferred to the free acid or to salts with pharmaceutically acceptable cations according to methods known per se, for instance by treatment of a salt with a strong acid, by using a suitable ion exchanger or by carrying out a double decomposition in a suitable solvent.

The methods used when synthetizing the secondary phosphoric acid esters of the invention have to be chosen in such a way that all groups in the starting materials involved are compatible with the method used or, if necessary, sensitive groups ae are protected during the reaction and then converted to the desired groups so that compounds of the general formula (I) above are obtained.

The hydroxy compounds A—OH, i.e. (II), or functional derivatives thereof, used as starting materials in the preparation of the secondary phosphoric acid esters of the general formulas (II) and (III), are prepared according to known methods. Among useful methods to prepare these compounds, having two benzene rings connected with the group X or a group $R^{25}$, different from X, which can be converted to the group X by known methods at any suitable stage during the preparation of the secondary phosphate esters, the following types of reactions may be mentioned: Acetoacetic ester synthesis, Claisen-Schmidt condensation, Friedel-Crafts reaction, Fries rearrangement, Grignard reaction, Houben-Hoesch reaction, Knoevenagel condensation, Malonic ester synthesis, Necki reaction and Wittig reaction.

In all these types of reactions, appropriately substituted benzene compounds are used to form the compound A—OH, a functional derivative thereof, or a compound having two appropriately substituted benzene rings connected to each other by a group $R^{25}$, which by conventional methods in one or more reaction steps, can be converted to the desired compound A—OH or a functional derivative thereof.

As examples of transformations in the group X (or $R^{25}$) the following reactions can be mentioned.

If $R^{25}$ carries a suitable hydroxylgroup such group can be converted to a carbonyl group by an oxidizing agent, e.g. an Oppenauer oxidation or a Sarett oxidation.

To insert groups like lower alkyl, phenyl and benzyl in X (or $R^{25}$) methods are found in references given below or in the examples of preparation.

Further details about the name reactions mentioned above are found e.g. in the Merck Index, 8th Ed., 1968, in the topic "Organic name reactions", p. 1137, and in references given there. Other references to these and other useful methods are found in reviews such as: Organic Reactions 18 (1970),1; and in monographs such as: G. A. Olah, "Friedel-Crafts and Related Reactions", vol. II, part 1, and vol. III, part 1 (New York, 1964); and C. A. Buchler, D. E. Pearson, "Survey of Organic Syntheses" (New York, 1970), p. 623.

The reactions mentioned above to prepare A—OH (II) or functional derivatives thereof, are carried out in such a manner that each group of the compounds involved is compatible with the process in question or protected when necessary.

When the compound A—OH (II) also carry other reactive groups such as —OH, primary and secondary amines and carboxylic acids, these groups are, when necessary, protected during the synthesis of the phosphate esters. Suitable protecting groups for -OH and amines are found in the monographs, S. Patai, "The Chemistry of the Hydroxyl Group" (London, 1971), p. 1001, and S. Patai, "The Chemistry of the Amino Group" (London, 1968), p. 669. A free carboxylic acid group can, for instance, be protected by converting it to a suitable ester. Such protecting group or groups can then be removed at any suitable stage during the preparation of the secondary phosphoric acid esters.

The compounds of the invention are generally characterized by the pharmacological activity hereinbefore stated, making them useful in counteracting certain physiological abnormalities in a living animal body. Effective quantities of the pharmacologically active compounds of the invention may be administered to a living animal body in anyone of various ways, for example orally as in capsules or tablets, parenterally in the form of sterile solutions, suspensions and by pellet implantation. Among routes of parenteral administration are intravenously, subcutaneously, intramuscularly, intraperitoneally, intraarticularly, intradermally and subconjunctivally. Other modes of administration are lingually, vaginally, rectally, by aerosol and topically as e.g. in the form of ointments, eye-drops etc.

As representative of living animal bodies, which may be treated with the compounds and compositions of the invention, and according to the method of treatment of the invention, for alleviation of the same and/or similar conditions as those described, the following may be mentioned: domestic animals such as dogs and cats, farm animals such as horses, cows, sheep and goats.

Pharmaceutical formulations are usually prepared from a predetermined quantity of one or more of the compounds of the invention. Such formulations may take the form of powders, syrups, suppositories, ointments, eye-drops, elixirs, solutions, aerosols, pills, capsules, pellets or tablets, suspensions, emulsions, oil solutions etc., with or without, but preferably with, any one of a large variety of pharmaceutically acceptable vehicles or carriers. When in admixture with a pharmaceutical vehicle or carrier, the active ingredient usually comprises from about 0.01 to about 75 per cent, normally from about 0.05 to about 15 per cent, by weight of the composition. Carriers such as starch, sugar talc, commonly used synthetic and natural gums, water, and the like, may be used in such formulations. Binders such as polyvinylpyrrolidone and lubricants such as sodium stearate, may be used to form tablets. Disintegrating agents such as sodium bicarbonate may also be included in tablets.

Although relatively small quantities of the active materials of the invention, even as low as 5.0 milligrams, may be used in cases of administration to subjects having a relatively low body weight, unit dosages are preferably 5 milligrams or above and preferably 25, 50, or 100 milligrams, or even higher, depending of course upon the subject treated and the particular result desired, as will be apparent to one skilled in the art. Broader ranges appear to be 0.1 to 3000 milligrams per unit dose. The active agents of the invention may be combined for administration with other pharmacologically active agents such as natural or synthetic prostaglandins or analogues, antiseptics, spasmolytics, analgesics, tranquillizers, steroids or hormones, or the like, or with buffers, antacids or the like, and the proportion of the active agent or agents in the compositions may be varied widely. It is only necessary that the active ingredient of the invention constitutes an effective amount, i.e. such that a suitable effective dosage will be obtained consistent with the dosage form employed. Obviously, several unit dosage forms may be administered at about the same time. The exact individual dosages as well as daily dosages in a particular case will of course be determined according to well established medical and/or veterinary principles. As a rule, however, when used therapeutically, the present compounds may be administered in a quantity of 1 to 1000 milligrams per day and subject, divided in 1 or more doses, over a suitable period.

The following examples are intended to illustrate but not to limit the scope of the invention

EXAMPLE 1

3.02 g of 4-hydroxy-3,5-dimethylbenzophenone dissolved in 12 ml pyridine is slowly added (10 min.) with stirring to a solution of 0.46 ml phosphorus oxychloride in 5 ml pyridine at a temperature of −20°C. The reaction mixture is kept at −5°C for 2 hours, and then at room temperature for an additional 70 hours. Water is then added and the resulting solution poured into a separatory funnel containing a mixture of 2.5 M hydrochloric acid (100 ml) and ethyl acetate (100 ml). The organic phase is washed with water and saturated disodium sulphate solution. The ethyl acetate solution is then dried with disodium sulphate, filtered and evaporated in vacuo and the residue chromatographied on silica gel. The small amount of tertiary phosphate ester present is eluated with ethyl acetate. The secondary ester is then eluated with ethyl acetate: methanol (1:9), collected and evaporated in vacuo. The residue is dissolved in aceton:water (1:4) with sodium hydroxide to a pH-value of about 5. Most of the acetone is removed in vacuo and the remaining water solution freeze-dried. The salt obtained is sodium bis(4-benzoyl-2,6-dimethylphenyl) phosphate, pure in TLC.

In substantially the same manner the following symmetrical phosphoric acid esters are prepared and isolated as free acids.

bis(4-(2-methoxycarbonylbenzoyl)phenyl) hydrogen phosphate from methyl 2-(4-hydroxybenzoyl-benzoate.

bis (4-benzoyl-3-methoxycarbonylphenyl) hydrogen phosphate from methyl 2-benzoyl-5-hydroxybenzoate (which is obtained from 2-benzoyl-5-hydroxybenzoic acid by esterification with methanol).

bis(4-benzoyl-3-methoxycarbonylmethylphenyl) hydrogen phosphate from methyl 2-benzoyl-5-hydroxyphenyl-acetate (which is obtained from Friedel-Craft reaction between methyl 3-hydroxyphenylacetate and benzoyl chloride).

bis(4-benzoyl-3-methoxycarbonylmethoxyphenyl) hydrogen phosphate from methyl 2-benzoyl-5-hydroxyphenoxyacetate (which is obtained from Friedel-Craft reaction between methyl 3-hydroxyphenoxyacetate and benzoyl chloride).

bis(3-benzoyl-4-methoxycarbonylmethoxyphenyl) hydrogen phosphate from methyl 2-benzoyl-4-hydroxyphenoxyacetate (which is obtained by esterification of 4-hydroxyphenoxyacetic acid with methanol, followed by Friedel-Craft reaction of the obtained methyl ester with benzoyl chloride).

bis(4-(2-butoxycarbonylbenzoyl)phenyl) hydrogen phosphate from 2'-butoxycarbonyl-4-hydroxybenzophenone which is obtained from 2'-carboxy-4-hydroxybenzophenone by esterification with n-butyl alcohol.

bis(4-benzoyl-3-butoxycarbonylmethylphenyl) hydrogen phosphate from 2-butoxycarbonylmethyl-4-hydroxybenzophenone (which is obtained by esterification of 3-hydroxyphenylacetic acid with n-butyl alcohol, followed by Friedel-Craft reaction of the obtained ester with benzoyl chloride.

bis(4-benzoyl-3-butoxycarbonylmethoxyphenyl) hydrogen phosphate from 2-butoxycarbonylmethoxy-4-hydroxy-benzophenone (which is obtained by esterification of 3-hydroxy-phenoxyacetic acid with n-butanol, followed by Friedel-Craft reaction of the obtained ester with benzoyl chloride).

In substantially the same manner the sodium salts of the following symmetrical secondary phosphoric acid esters are prepared.

sodium bis(3,5-dimethoxy-4-(4-methoxyphenylacetyl) phenyl) phosphate from 2,4',6-trimethoxy-4-hydroxy-deoxybenzoin (which is obtained from Hoeben-Hoesch reaction between p-methoxybenzonitrile and 3,5-dimethoxyphenol).

sodium bis(2,6-dimethoxy-4-(2,4,6-trimethoxybenzoyl)phenyl) phosphate from 4-hydroxy-2',3,4',5,6'-pentamethoxybenzophenone (which is obtained from Friedel-Craft reaction between 2,6-dimethoxyphenol and 2,4,6-trimethoxybenzoyl chloride).

sodium bis(3-(2,4,6-trimethoxybenzoyl)phenyl) phosphate from 3-hydroxy-2',4',6'-trimethoxybenzophenone (which is obtained from Hoesch reaction between 1,3,5-trimethoxybenzene and m-hydroxybenzonitrile).

sodium bis(4-(2,4,6-trimethoxybenzoylmethyl)phenyl) phosphate from 4'-hydroxy-2,4,6-trimethoxy-deoxybenzoin (which is obtained from Hoesch reaction between 1,3,5-trimethoxybenzene and p-hydroxybenzyl cyanide).

bis(ethylene ketal) of sodium bis(4-(phenylacetyl)phenyl) phosphate from 4-hydroxybenzoin in the form of its ethylene ketal (which is prepared from 4-hydroxydeoxybenzoin and ethylene glycol in benzene with azeotropic distillation of water).

sodium bis(4-(3-nitrobenzoyl)phenyl) phosphate from 4-hydroxy-3'-nitro-benzophenone.

sodium bis(4-(3-fluorobenzoyl)-2,5-dimethylphenyl) phosphate from 3'-fluoro-4-hydroxy-2,5-dimethyl-benzophenone (which is obtained from Friedel-Craft reaction between 2,5-dimethylphenol and m-fluorobenzoyl chloride).

sodium bis(2-allyl-4-benzoylphenyl) phosphate from 3-allyl-4-hydroxy-benzophenone sodium bis(4-phenylacetyl-2-propionylphenyl) phosphate from 4-hydroxy-3-propionyl-deoxybenzoin (which is obtained from Friedel-Craft reaction between 3-hydroxyacetanilide and phenyl acetyl chloride.

sodium bis(4-(4-trifluoromethylbenzoyl)phenyl) phosphate from 4-hydroxy-4-trifluoromethylbenzophenone (which is obtained by Friedel-Craft reaction between phenol and 4-trifluoromethylbenzoylchloride).

sodium bis(2-acetylaminomethyl-4-benzoyl-6-methylphenyl) phosphate from 3-acetylaminomethyl-4-hydroxi-5-methyl-benzophenone.

sodium bis(2-diethylaminomethyl-4-benzoyl-6-methylphenyl) phosphate from 3-diethylaminomethyl-4-hydroxy-5-methyl-benzophenone.

sodium bis(3-(2,5-dimethylbenzoyl)phenyl) phosphate from 3-hydroxy-2',5'-dimethyl-benzophenone (which is obtained from Friedel-Craft reaction between p-xylene and m-methoxybenzoyl chloride, followed by demethylation with pyridine hydrobromide).

sodium bis(3-(2,4,6-trimethylbenzoyl)phenyl) phosphate from 3-hydroxy-2',4',6'-trimethyl-benzophenone (which is obtained from Friedel-Craft reaction between mesitylene and m-methoxybenzoyl chloride, followed by demethylation with pyridine hydrobromide).

sodium bis(4-(2-methoxy-1-oxo-2-phenylethyl)phenyl) phosphate from 1-(4-hydroxyphenyl)-2-methoxy-2-phenylethanone (which is obtained from 4-hydroxy-benzoin by reaction with methanol).

sodium bis(4-(2,4,6-trimethylbenzoyl)phenyl)phosphate from 4-hydroxy-2',4',6'-trimethyl-benzophenone (which is obtained from Friedel-Craft reaction between mesitylene and p-methoxybenzoylchloride, followed by demethylation with pyridine hydrobromide).

sodium bis(4-(2,5-dimethylbenzoyl)-2,6-dimethylphenyl) phosphate from 4-hydroxy-2',3,5,5'-tetramethyl-benzophenone (which is obtained from Friedel-Craft reaction between 2,6-dimethylphenol and 2,5-dimethylbenzoylchloride).

sodium bis(4-(2,4-dimethylbenzoyl)-2,6-dimethylphenyl)phosphate from 4-hydroxy-2',3,4',5-tetramethyl-benzophenone (which is obtained from Friedel-Craft reaction between 2,6-dimethylphenol and 2,4-dimethylbenzoylchloride).

sodium bis(4-(3,5-dimethylbenzoyl)-2,6-dimethylphenyl) phosphate from 4-hydroxy-3,3',5,5'-tetramethyl-benzophenone (which is obtained from Friedel-Craft reaction between 2,6-dimethylphenol and 3,5-dimethylbenzoylchloride).

sodium bis(4-benzoyl-2,3,5,6-tetramethylphenyl) phosphate from 4-hydroxy-2,3,5,6-tetramethyl-benzophenone (which is obtained from Friedel-Craft reaction between 2,3,5,6-tetramethylphenol and benzoylchloride).

sodium bis(4- bis(2-(4-chlorophenyl) acetyl)-phenyl) phosphate from bis(2-(4-chlorophenyl))-4'-hydroxyacetophenone (which is obtained from Friedel-Crafts reaction between bis(4-chlorophenyl)acetyl chloride and anisol followed by demethylation with pyridine hydrobromide).

sodium bis(4-benzoyl-2,6-di-t-butylphenyl) phosphate from 4-hydroxy-3,5-di-t-butyl-benzophenone.

sodium bis(4-benzoyl-2-t-butyl-6-methyl phenyl) phosphate from 4-hydroxy-3-t-butyl-5-methyl-benzophenone (which is obtained by treating the Na-salt of 2-tert.-butyl-6-methyl-phenol with benzoyl chloride in dioxane).

sodium bis(4-(2,4-dimethylbenzoyl)-2,6-dimethoxy phenyl) phosphate from 4-hydroxy-3,5-dimethoxy-2'4'-dimethyl-benzophenone (which is obtained directly from Friedel-Craft reaction between m-xylene and 3,4,5-trimethoxy benzoyl chloride).

sodium bis(4-benzoyl-2-propionyl phenyl) phosphate from 4-hydroxy-3-propionyl-benzophenone (which is obtained from Friedel-Craft reaction between o-hydroxypropiophenone and benzoylchloride).

sodium bis(4-(3,5-dimethoxybenzoyl)phenyl phosphate from 4-hydroxy-3',5'-dimethoxy-benzophenone (which is obtained from Friedel-Craft reaction between phenol and 3,5-dimethoxy benzoyl chloride).

sodium bis(4-(3,5-dimethoxibenzoyl)-2,6-dimethylphenyl) phosphate from 4-hydroxy-3',5'-dimethoxy-3,5-dimethyl-benzophenone (which is obtained from Friedel-Craft reaction between 2,6-dimethylphenol and 3,5-dimethoxybenzoyl chloride).

sodium bis(4-benzoyl-2-bromophenyl) phosphate from 3-bromo-4-hydroxy-benzophenone.

sodium bis(4-benzoyl-2,6-dibromophenyl) phosphate from 3,5-dibromo-4-hydroxy-benzophenone.

sodium bis(4-benzoyl-2-chlorophenyl) phosphate from 3-chloro-4-hydroxy-benzophenone.

sodium bis(4-(2-bromobenzoyl)-phenyl) phosphate from 2'-bromo-4-hydroxybenzophenone.

sodium bis(3-(4-methylbenzoyl)phenyl) phosphate from 3-hydroxy-4'-methyl-benzophenone (which is obtained from Friedel-Craft reaction between toluene and m-methoxy benzoyl chloride, followed by demethylation with pyridine hydrobromide).

sodium bis(3-(2,3,5,6-tetramethylbenzoyl)phenyl) phosphate from 3-hydroxy-2',3',5',6'-tetramethyl-benzophenone (which is obtained from Friedel-Craft reaction between durene and m-methoxy benzoyl chloride, followed by demethylation with pyridine hydrobromide).

sodium bis(3-methyl-4-phenylacetylphenyl) phosphate from 4-hydroxy-2-methyl-deoxybenzoin.

sodium bis(2,6-dimethyl-4-phenylacetylphenyl) phosphate from 4-hydroxy-3,5-dimethyl-deoxybenzoin (which is obtained from Friedel-Craft reaction between 2,6-dimethylphenol and phenyl acetyl chloride).

sodium bis(4-(4-methoxyphenyl acetyl)phenyl) phosphate from 4-hydroxy-4'-methoxy-deoxybenzoin (which is obtained by partial demethylation of 4,4'-dimethyldeoxybenzoin with hydrobromic acid).

sodium bis(4-phenyl acetyl-2-propionyl phenyl) phosphate from 4-hydroxy-3-propionyldeoxybenzoin (which is obtained from Friedel-Craft reaction between o-hydroxypropiophenone and phenyl acetyl chloride).

sodium bis(4-(2-n-butoxy-1-oxo-2-phenylethyl)-phenyl)phosphate from 1-(4-hydroxyphenyl)-2-n-butoxy-2-phenylethanone, (which is obtained from 1-(4-hydroxyphenyl)-2-hydroxy-2-phenylethanone by reaction with n-butanol.

sodium bis(4-(4-n-butoxybenzoyl)phenyl) phosphate from 4-hydroxy-4'-butoxy-benzophenone(which is obtained from Friedel-Craft reaction between 4-n-butoxybenzoyl chloride and phenol).

sodium bis(4-(2-cyanobenzoyl)phenyl) phosphate from 2'-cyano-4-hydroxybenzophenone (which is obtained from 2'-methoxycarbonyl-4-hydroxybenzophenone through 2'-carbanoyl-2-hydroxybenzophenone).

sodium bis(4-(2-cyclohexyl-1-oxo-2-phenylethyl)-phenyl)phosphate from 2-cyclohexyl-1-(4-hydroxyphenyl)-2-phenylethanone (which is obtained by treatment of 4-methoxy deoxybensoin with cyclohexylbromide in the presence of sodium ethylate, followed by demethylation with pyridine hydrobromide).

sodium bis(4-(1-oxo-2,2-diphenylethyl)phenyl) phosphate from 1-(4-hydroxyphenyl)-2,2-diphenylethanone.

sodium bis(4-(2-(3-methylphenyl)-2-(4-methylphenyl)acetyl) phenyl) phosphate from 4'-hydroxy-2-(3-methylphenyl)-2-(4-methylphenyl)acetophenone (which is obtained from (3-methylphenyl)-(4-methylphenyl)acetyl chloride and anisol in Friedel-Crafts reaction and then demethylated with pyridine hydrobromide.

EXAMPLE 2

36.4 g of 4'-acetoxy-α-ethyl-4-hydroxy-deoxybenzoin (which is obtained from α-ethyl-4,4'-dihydroxydeoxybenzoin by monoacetylation with acetic anhydride) is dissolved in 120 ml dry pyridine and slowly added with stirring during 2 hours to a solution of 4.57 ml phosphorus oxychloride in 50 ml pyridine at a temperature of about −20°C. The reaction mixture is then left at −5°C for 2 hours, and at room temperature for an additional 70 hours. Water is then added and the resulting mixture poured into a separatory funnel containing 5 M hydrochloric acid (500 ml), ice (500 g) and ethyl acetate (900 ml). The water solution is washed with ethyl acetate and then the mixed ethyl acetate solution is washed with water. The ethyl acetate is removed in vacuo and the residue is dissolved in ethanol (400 ml) and 5 M sodium hydroxide solution (150 ml) is added. The reaction mixture is left at room temperature until the next day and then heated on a steam bath for 1 hour (hydrolysis of the protecting groups and of any tertiary phosphoric acid esters which might be formed during the reaction). Then most of the ethanol is removed in vacuo, water (200 ml) added and the pH adjusted to 5 with 5 M hydrochloric acid. After adding 0.4 M acetate buffer (pH 5, 100 ml) the resulting mixture is boiled for 15 hours to hydrolyze any primary phosphoric acid ester groups present. The unphosphorylated 2,4-dihydroxy-4'-methoxy-deoxybenzoin is then removed by extraction with ether and a pure (TLC) product is obtained by precipitation with hydrochloric acid and washing the precipitate with ethanol-water and finally water.

The substance is dissolved in acetone:water with sodium hydroxide to a pH-value of about 4. Most of the acetone is removed in vacuo and the remaining water solution freeze-dried.

The salt obtained is sodium bis(4-(2-(4-hydroxyphenyl) butyryl)phenyl)phosphate.

In substantially the same manner the following symmetrical secondary phosphoric acid esters are obtained.

Sodium bis(4-(4-methoxyphenylacetyl)-3-hydroxyphenyl) phosphate from 2-benzoyloxy-4-hydroxy-4'-methoxydeoxybenzoin which is prepared from 2,4-dihydroxy-4'-methoxydeoxybenzoin through 2-hydroxy-4-methoxymethoxy-4'-methoxy-deoxybenzoin and 2-benzoyloxy-4-methoxymethoxy deoxybenzoin.

Sodium bis(4-(2-(4-hydroxyphenyl)-3-phenylpropionyl)phenyl) phosphate from 4'-acetoxy-α-butyl-4-hydroxy-deoxybenzoin (which is obtained by monoacetylation with acetic anhydride of α-butyl-4,4'-dihydroxydeoxybenzoin. The latter compound is obtained from 4,4'-dimethoxydeoxybenzoin by monoalkylation with n-butylbromid, followed by demetylation with pyridine hydrobromide.

Sodium bis(4-benzoyl-3-hydroxyphenyl) phosphate from 2-benzoyloxy-4-hydroxybenzophenone (which is obtained from 2,4-dihydroxybenzophenone through 2-hydroxy-4-methoxymethoxybenzophenone and 2-benzoyloxy-4-methoxymethoxybenzophenone)

Sodium bis(4-(4-methoxyphenylacetyl)-3-hydroxy-2-methyl)phenyl) phosphate from 2-benzoyloxy-4-hydroxy-4'-methoxy-3-methyl-deoxybenzoin (which is obtained from 2,4-dihydroxy-4'-methoxy-3-methyldeoxybenzoin through 2-hydroxy-4-methoxymethoxy-4'-methoxy-3-methyldeoxybenzoin and 2-benzoyloxy-4-methoxymethoxy-4'-methoxy-3-methyldeoxybenzoin).

Sodium bis(4-(2-hydroxy-1-oxo-2-phenylethyl)phenyl) phosphate, which is obtained from 1-(4-hydroxy-phenyl)-2-acetoxy-2-phenylethanone. The latter compound is obtained from 1-(4-hydroxyphenyl)-2-hydroxy-2-phenylethanone through 1-(4-methoxymethoxyphenyl)-2-hydroxy-2-phenylethanone and 1-(4-methoxymethoxyphenyl)-2-acetoxy-2-phenylethanone.

Sodium bis(4-(2-(4-hydroxyphenyl)-4-pentenoyl) phenyl) phosphate, which is obtained from 4'-acetoxy-α-allyl-4-hydroxy-deoxybenzoin. The latter compound is obtained by monoacetylation with acetic anhydride of α-allyl-4,4'-dihydroxydeoxybenzoin, which is obtained by monoalkylation of 4,4'-dimethoxy-deoxybenzoin, followed by demethylation with pyridine hydrobromide.

EXAMPLE 3

To a solution of 5.16 g 2',4'-dimethoxy-4-hydroxybenzophenone (which is obtained from Friedel-Craft reaction of 1.3-dimethoxybenzene and p-hydroxybenzoic acid in polyphosphoric acid) in dry pyridine (20 ml), 2.66 g of freshly distilled trichloroethylphosphorodichloridate is added with stirring at a temperature of about −15°C. The temperature of the resulting reaction mixture is then allowed to rise to room temperature and kept at this level for another 70 hours. Water is then added and the resulting mixture poured into a mixture of ethyl acetate and 1 M hydrochloric acid. The ethyl acetate solution is then washed with 0.5 M hydrochloric acid, water, 0.5 M sodium bicarbonate solution and finally with water. After drying over anhydrous sodium sulphate the ethyl acetate is removed in vacuo. The resulting oil is dissolved in 50 ml of a mixture of pyridine-acetic acid (8:2). At a temperature of 0°C activated Zn (J. Bio. Chem. 230 (1958) 447; J. Org., Chem. 29 (1964) 2048) is added with stirring. After ½ hour at 0°C the temperature is allowed to rise to room temperature. The next day the reaction mixture is filtered and the clear solution obtained poured in 2 M hydrochloric acid. Ethyl acetate is added and the water solution discarded. The ethyl acetate solution is washed with water. Water is added and pH is adjusted to 4 with sodium hydroxide. By freeze-drying the obtained water solution sodium bis(4-(2,4-dimethoxybenzoyl)phenyl) phosphate is obtained as a slightly yellow powder.

In substantially the same manner the sodium salts of symmetrical secondary phosphoric acid esters from the following starting materials are obtained.

Sodium bis(4-benzoyl-3-methoxyphenyl) phosphate from 4-hydroxy-2-methoxy-benzophenone.

Sodium bis(4-benzoyl-3,5-dimethoxyphenyl) phosphate from 4-hydroxy-2,6-dimethoxy-benzophenone.

Sodium bis(4-(4-methoxybenzoyl)-3-methoxyphenyl) phosphate from 4-hydroxy-2,4'-dimethoxy-benzophenone (which is obtained from Friedel-Craft reaction between m-methoxyphenol and p-methoxybenzoyl chloride).

Sodium bis(4-(3,5-dimethyl-benzoyl)phenyl) phosphate from 4-hydroxy-3',5'-dimethyl-benzophenone (which is obtained from Friedel-Craft reaction between anisole and 3,5-dimethylbenzoyl chloride followed by demethylation with pyridine hydrobromide).

EXAMPLE 4

A solution of 2 g triethylamine in 20 ml dry benzene is slowly added (20 min.) to a refluxing solution of 1,5 g N-methylphosphoramidic dichloride and 5.6 g 2,4,6-trimethoxy-4'-hydroxy-deoxybenzoin (which is obtained from Hoesch reaction between 1,3,5-trimethoxybenzene and p-hydroxybenzyl cyanide) in 40 ml dry benzene. Heating is continued for 1 hour. After cooling the precipitated triethylamine hydrochloride is removed by filtration and the benzene solution washed successively with dilute hydrochloric acid, sodium hydrogen carbonate solution and water. After drying over anhydrous sodium sulphate the benzene is removed by evaporation in vacuo. The amidate is obtained as an oil which is heated under reflux in 50 percent aqueous formic acid for 1 hour and then evaporated to dryness in vacuo. The residual oil is dissolved in ethyl acetate and the solution washed with saturated sodium sulphate solution and finally water. After evaporation in vacuo an oil is obtained which after column chromatography gives a product pure in TLC.

The substance is dissolved in acetone:water with sodium hydroxide to a pH-value of about 4. Most of the acetone is removed in vacuo and the remaining water solution freeze-dried.

The salt obtained is sodium bis(4-(2,4,6-trimethoxybenzoylmethyl)phenyl)phosphate.

EXAMPLE 5

2.64 g of the 4-(2,4,6-trimethoxybenzoyl)phenyl dihydrogen phosphate obtained according to Example 17 is dissolved in dry pyridine (20 ml) and the pyridine then evaporated in vacuo. This drying process is repeated twice and the residue is then dissolved in dry pyridine (30 ml) and triethylamine (2.02 ml) and 1,3,-5-triisopropylbenzenesulphonyl chloride (4.46 g) is added. The reaction mixture is kept at room temperature for 2 hours and after the addition of 2', 4', 6'-trimethoxy-4-hydroxy-benzophenone (2.08 g) left for 70 hours at the same temperature. Water is then added and the resulting solution poured in an excess of 2 M hydrochloric acid. The resulting precipitate is collected by filtration, washed with water and then dissolved in ethanol-water with sodium hydroxide to a pH-value of about 5. An amount of 0.4 M acetate buffer (pH 5) corresponding to about half the volume of the reaction mixture is added and the resulting mixture is boiled for 15 hours, so that all unreacted monophosphate ester is hydrolyzed. The unphosphorylated product is removed by extraction with ether and a pure (TLC) product is obtained by precipitation with hydrochloric acid and washing the precipitate with water. The substance is dissolved in acetone: water with sodium hydroxide to a pH-value of about 5. Most of the acetone is removed in vacuo and the remaining water solution freeze dried.

The salt obtained is sodium bis(4-(2,4,6-trimethoxybenzoyl)phenyl) phosphate.

In substantially the same manner the following substances are prepared:

sodium 4-(2,4,6-(trimethoxybenzoyl)phenyl 4-benzoyl-2,6-dimethylphenyl phosphate from 4-(2,4,6-trimethoxybenzoyl)phenyl dihydrogen phosphate and 3,5-dimethyl-4-hydroxybenzophenone sodium bis(4-(4-methoxybenzoyl)-3,5-dimethoxyphenyl) phosphate from 4-hydroxy-2,4',6-trimethoxy-benzophenone (which is obtained from Houben-Hoesch reaction between p-methoxybenzonitrile and 3,5-dimethoxyphenol).

EXAMPLE 6

A solution of 5.8 g of 4-hydroxy-2',4',6'-trimethoxybenzophenone in 70 ml of dry pyridine is slowly added (20 min) with stirring to a solution of 34.3 g of 4-benzoyl-2,6-dimethylphenyl phosphorodichloridate (which is obtained from phosphorus oxychloride and the corresponding phenol) in 50 ml of dry pyridine at a temperature of −10°C. After an additional hour the temperature is kept at 0°C for 1 hour and then at room temperature until the next day. The reaction mixture is poured on crushed ice (95 ml) and the resulting solution evaporated in vacuo to a volume of about 75 ml. The residue is poured into a mixture of 5 M hydrochloric acid (50 ml) and ice (100 g). The precipitate formed is extracted with ethyl acetate. The organic phase is washed with water and dried with magnesium sulphate. The solvent is evaporated at reduced pressure. The residue is mixed with 100 ml of water and dissolved by addition of 1 M sodium hydroxide to pH 5. After extraction with ether the aqueous phase is freeze-dried giving sodium 4-(2,4,6-trimethoxybenzoyl)phenyl 4-benzoyl-2,6-dimethylphenyl phosphate.

EXAMPLE 7

21.5 g of 4'acetoxy-α-ethyl-4-hydroxy-deoxybenzoin (see Example 2 ) dissolved in 400 ml of pyridine is slowly (90 min) added with stirring to a solution of 114 g of 4-benzoyl-2,6-dimethylphenyl phosphorodichloridate (which is obtained from phosphorus oxychloride and the corresponding phenol) in 400 ml of dry pyridine at −10°C. After an hour at 0°C the reaction mixture is kept at room temperature until the next day. It is then poured on crushed ice (400 g) and evaporated in vacuo to a volume of about 300 ml. It is then poured in a mixture of 900 ml of conc. hydrochloric acid and 900 g of ice. The solution is decanted and the precipitate is dissolved in 350 ml of ethanol and reprecipitated by adding 700 ml of water. The dissolving ethanol and precipitating with water is repeated once. The residue is dissolved in 1000 ml of ethyl acetate. The solution is dried with anhydrous sodium sulphate and evaporated to dryness in vacuo. The residue is dissolved in 670 ml of methanol and at a temperature of +20°C 200 ml of 2.5 M sodium hydroxide solution is added under nitrogen. After 30 min. at 20°C the pH-value is adjusted to 5.0 with 5 M hydrochloric acid and the mixture evaporated in vacuo to a volume of about 150 ml. An oil is obtained which is collected and treated with 4×400 ml ether to remove benzoic acid. The residue is then treated with 800+400 ml of ethyl acetate. The solution obtained is dried with sodium sulphate and evaporated in vacuo. The residue is dissolved in water so that a clear solution is obtained. By freeze-drying of this solution sodium 4-benzoyl-2,6-dimethylphenyl 4-(2-(4-hydroxyphenyl)butyryl)-phenyl phosphate is obtained as a yellow powder. The compound is pure in TLC and its structure is confirmed by NMR.

EXAMPLE 8

4-hydroxy-2',4',6'-trimethoxybenzophenone (1.9 g ; 6.6 moles) tetrahydrofurane (6ml), pyridine (0.54 ml, 6.7 mmoles) and 2-chloromethyl-4-nitrophenylphosphorodichloridate (0.91 g, 3 mmoles) are kept for 24 h at room temperature, and then 1 h at 60°C. After cooling pyridine hydrochloride is filtered off and the solvent is evaporated. The residue is dissolved in benzene and chromatographed on a silica gel column. The tertiary phosphate ester is eluated with benzene and evaporated. Yield 0.55 g.

0.5 g of the tertiary phosphate is dissolved in 10 ml of pyridine. Water is added until the solution becomes opalescent. The solution is kept at room temperature for 2 days and then heated at 80°C for 8 h. The reaction is followed on TLC (water—n—BuOH). The reaction mixture is poured into 20 ml of ethylacetate and 0.2 M hydrochloric acid. The filtered ethylacetate solution is evaporated in vacuo. Methanol is added and the undissolved is filtered off. The pH of the solution is adjusted to 7 with 5 M sodium hydroxide, evaporated, dissolved in acetone and precipitated with ether. Yield 0.19 g of sodium bis(4-(2,4,6-trimethoxybenzoyl)phenyl) phosphate.

EXAMPLE 9

4.8 g of 4-benzoyl-2,6-dimethylphenyl-2-chloromethyl-4-nitrophenyl hydrogen phosphate (which is obtained in substantially the same manner as the corresponding p-tolyl-derivative described in Tetrahedron Letters No. 40, p. 3505-3508, 1970), 5.9 g of 4-hydroxy-2',4',6'-trimethoxybenzophenone and 4 ml of dry pyridine is kept at room temperature for two days and then heated at 90°C over night. 30 ml of absolute ethanol is added and the mixture is stirred at room temperature for several minutes. A yellow precipitate of 1-(2'-hydroxy-5'-nitro-benzyl)pyridinium chloride is filtered and washed with two 20 ml portions of absolute ethanol.

The combined alcoholic filtrate and washings are evaporated to dryness under reduced pressure. The residue is poured into a mixture of 25 ml of 2 M hydrochloric acid and ethyl acetate. Water is added to the organic layer and pH is adjusted to 5 with 1 M sodium hydroxide. The aqueous layer is freeze-dried giving sodium 4-benzoyl-2,6-dimethylphenyl 4-(2,4,6-trimethoxybenzoyl)-phenyl phosphate.

EXAMPLE 10

Hydrogen chloride is led for 6 hours with stirring into a solution of bis(4-(2-cyanomethyl)phenyl) N-methylphosphoramidate (prepared from p-hydroxybenzylcyanide and N-methyl phosphoramidic dichloride in substantially the manner reported in J. Chem. Soc. (C) 1966, 637 for diphenyl N-methylphosphoramidate)43 g (0.119 mol), phloroglucinol 30 g (0.238 mol) kept at 0°C. The mixture is kept at about 5°C over night, diluted with 150 ml of sulfolane and poured into 2 l of benzene with stirring which is continued for 20 min. The benzene solution is decanted and the residue is treated first with 1 l of benzene and then with 2+1 l of diethyl ether. The oily residue is refluxed under nitrogen with 2 l of 1 M $H_2SO_4$ and 4 l of methanol for 7 hours. The cooled solution is neutralized to pH 5 with 5 M sodium hydroxide. The methanol is evaporated in vacuo and the residue is mixed with 2 M HCl and extracted with ethyl acetate. The ethyl acetate solution is mixed with water and titrated with 1 M NaOH to pH 5 whereupon ether is added. The aqueous phase is collected and after removing its opalescence with celite, freeze-dried. The crude product is dissolved in methanol and put on a Dowez 50W×8 100-200 mesh (H-form)column. The crude secondary phosphate is eluated with methanol. The methanol solution is concentrated to 200 ml and chromatographed on a 1 m Sephadex LH 20 column which is eluated with methanol. The fractions containing the desired product is titrated to pH 5 with 1 M sodium hydroxide. The methanol is evaporated at reduced pressure. The residue is dissolved in water and freeze-dried. The residue is sodium bis(4-(2-(2,4,6-trihydroxyphenyl)-2-oxoethyl)phenyl) phosphate, showing one spot on TLC.

In substantially the same manner, the following substances are prepared:
sodium bis(4-(2,4,6-trihydroxybenzoyl)-phenyl) phosphate from p-hydroxy benzonitrile and phloroglucinol.
sodium bis(4-(2-(2,4,6-trimethoxyphenyl)-2-oxoethyl) phenyl) phosphate from 1,3,5-trimethoxybenzene.

EXAMPLE 11

Acetic anhydride (5.1 g ) is added to a solution of sodium bis (4-(2-(2,4,6-trihydroxyphenyl)-2-oxoethyl)-phenyl) phosphate (4.5 g) in 20 ml of pyridine and triethylamine (1.02 g). The mixture is kept at room temperature for 18 hrs. and poured on 200 g of ice-water. The pH of the mixture is adjusted to 1 with 1 M hydrochloric acid at 0°C. The aqueous phase is discarded. The residue is ground with ice-water and dissolved in acetone : aq. (1:3). The pH of the solution is adjusted to 4.0. The acetone is evaporated in vacuo and the remaining syrup precipitate with solidifies on standing is sodium bis(4-(2-(2,4,6-triacetoxyphenyl)-2-oxoethyl)-phenyl) phosphate.

In substantially the same manner the following substances are prepared.

sodium bis(4-(3-acetylaminobenzoyl)phenyl)phosphate from sodium bis(4-(3-aminobenzoyl)-phenyl)phosphate (Ex. 13).

sodium bis(4-(4-acetylaminobenzoyl)phenyl) phosphate from sodium bis(4-(4-aminobenzoyl)phenyl) phosphate. (Ex. 13)

sodium bis(4-(2-(4-acetoxyphenyl)butyryl)phenyl) phosphate from sodium bis(4-(2-(4-hydroxyphenyl)butyryl)phenyl)phosphate.(Ex. 2)

sodium bis(4-(2-(4-acetoxyphenyl)-3-phenylpropionyl)phenyl) phosphate from sodium bis(4-(2-(4-hydroxyphenyl)-3-phenylpropionyl) phenyl) phosphate. (Ex. 2)

sodium bis(3-acetoxy-4-benzoylphenyl) phosphate from sodium bis(4-benzoyl-3-hydroxyphenyl) phosphate. (Ex. 2)

sodium bis(4-(4-methoxyphenylacetyl)-3-acetoxy-2-methyl)phenyl) phosphate from sodium bis(4-(4-methoxyphenylacetyl)-3-hydroxy-2-methyl)phenyl) phosphate. (Ex. 2)

sodium bis(4-(4-methoxyphenylacetyl)-3-acetoxyphenyl) phosphate from sodium bis(4-(4-methoxyphenylacetyl)-3-hydroxyphenyl) phosphate. (Ex. 2)

sodium bis(4-(2-(4-acetoxyphenyl)-4-pentenoyl)phenyl) phosphate from sodium bis(4-(2-(4-hydroxyphenyl)-4-pentenoyl)phenyl) phosphate. (Ex. 2)

sodium bis(4-(2-acetoxy-1-oxo-2-phenylethyl)phenyl) phosphate from sodium bis(4-(2-hydroxy-1-oxo-2-phenylethyl)phenyl) phosphate. (Ex. 2)

EXAMPLE 12

3.5 g sodium bis(4-(2-(4-hydroxyphenyl)butyryl)-phenyl) phosphate is dissolved in 50 ml dry pyridine and the solution added to a solution of 8.5 g phosphorus oxychloride in 80 ml dry pyridine. The temperature is maintained at −5°C during the addition. After the addition the mixture is kept at 0°C for one hour and at room temperature for one hour. The solution is then poured in a mixture of 100 ml water and 200 g ice. After evaporation to about 200 ml the solution is poured into a mixture of 100 ml hydrochloric acid and 200 g of ice. The precipitate is filtered off, washed with water and dried in vacuo. The obtained compound is:
bis(4-(2-(4-dihydroxyphosphinyloxyphenyl)butyryl)phenyl)-hydrogen phosphate.

EXAMPLE 13

4 g of sodium bis(4-(3-nitrobenzoyl)phenyl) phosphate (Ex. 1) is suspended in 150 ml water. 1 M sodium hydroxide solution is added dropwise to adjust the pH to about 9. 0.5 g palladium carbon catalyst is added and hydrogenation is carried out in a Parr hydrogenation apparatus at 40 psi. The reaction mixture is filtered and the solution is extracted with ethyl acetate to remove small quantities of non-phosphorylated products. The pH is adjusted with hydrochloric acid until the substance is precipitated. The precipitate is filtered off, washed with water and dried in vacuo. The substance so obtained is pure in TLC. The substance is dissolved in acetone:water (1:4) with sodium hydroxide to a pH-value of about 4. Most of the acetone is removed in vacuo and the remaining water solution freeze-dried.

The salt obtained is sodium bis(4-(3-aminobenzoyl)phenyl) phosphate.

EXAMPLE 14

5 g of bis(4-(2-methoxycarbonylbenzoyl)phenyl) hydrogen phosphate (Ex. 1) is dissolved in 250 ml ethanol. To the solution is slowly added 100 ml 1 M sodium hydroxide solution and the mixture is allowed to stand at room temperature over night. pH is adjusted to near neutral with hydrochloric acid whereupon the solution is evaporated to as small volume as possible without any precipitation. This solution is then poured into 5 M hydrochloric acid (150 ml). The precipitate is collected by filtration, dissolved in aqueous sodium hydroxide and reprecipitated with hydrochloric acid. The substance so obtained is pure in TLC. The substance is dissolved in acetone:water (1:4) with sodium hydroxide to a pH-value of about 4. Most of the acetone is removed in vacuo and the remaining water solution freeze-dried.

The salt obtained is sodium bis(4-(2-carboxibenzoyl)phenyl) phosphate.

In substantially the same manner the following symmetrical secondary phosphoric acid esters are obtained.

sodium bis(4-benzoyl-3-carboxyphenyl) phosphate from bis(4-benzoyl-3-methoxycarbonylphenyl) hydrogen phosphate. (Ex. 1).

sodium bis(4-benzoyl-3-carboxymethylphenyl) phosphate from bis(4-benzoyl-3-methoxycarbonylmethylphenyl) hydrogen phosphate. (Ex. 1).

sodium bis(4-benzoyl-3-carboxymethoxyphenyl) phosphate from bis(4-benzoyl-3-methoxycarbonylmethoxyphenyl) hydrogen phosphate. (Ex. 1).

sodium bis(3-benzoyl-4-carboxymethoxyphenyl) phosphate from bis(3-benzoyl-4-methoxycarbonylmethoxyphenyl) hydrogen phosphate. (Ex. 1).

EXAMPLE 15

5 g of bis(4-(2-methoxycarbonylbenzoyl) phenyl) hydrogen phosphate is suspended in 100 ml 10 M ammonia and the mixture stirred at room temperature for 24 hours. The mixture is carefully acidified and the precipitate filtered off and washed with water. The substance is dissolved in acetone:water with sodium hydroxide to a pH-value of about 4. Most of the acetone is removed in vacuo and the remaining water solution freeze-dried. The salt obtained is sodium bis(4-(2-carbamoylbenzoyl)phenyl phosphate.

In substantially the same manner the following substances are prepared sodium bis(4-benzoyl-3-carbamoylphenyl)phosphate from bis(4-benzoyl-3-methoxycarbonylphenyl) hydrogen phosphate. (Ex. 1)

sodium bis(4-benzoyl-3-carbamoylmethylphenyl)-phosphate from bis(4-benzoyl-3-methoxycarbonylmethylphenyl) hydrogen phosphate. (Ex. 1)

sodium bis(4-benzoyl-3-carbamoylmethoxyphenyl) phosphate from bis(4-benzoyl-3-methoxycarbonylmethoxyphenyl) hydrogen phosphate. (Ex. 1)

EXAMPLE 16

2 g of sodium bis 4-(2,4,6-trimethoxybenzoyl)phenyl) phosphate is dissolved in 150 ml water and 5 ml 50 percent solution of calcium chloride in water is added. The precipitate formed is collected by filtration, washed with water and dried in vacuo. The product is the calcium salt of bis 4-(2,4,6-trimethoxybenzoyl)-phenyl)hydrogen phosphate

EXAMPLE 17

2.9 g of 2', 4', 6'-trimethoxy-4-hydroxybenzophenone is dissolved in dry pyridine (50 ml). This solution is added with stirring during half an hour to a solution of 5 ml phosphorus oxychloride in dry pyridine (50 ml) kept at −10°C. The resulting reaction mixture is kept at −10°C for an additional hour and the temperature is then allowed to rise to room temperature. After one hour the clear solution is poured on crushed ice (50 g) and then most of the pyridine is removed in vacuo. The residue is dissolved in sodium hydroxide solution and this solution poured in an excess of 5 M hydrochloric acid. The resulting precipitate is dissolved in sodium hydroxide solution and reprecipitated with an excess of 5 M hydrochloric acid, collected with filtration, washed with water and dried in vacuo. The 4-(2,4,6-trimethoxybenzoyl)phenyl dihydrogen phosphate obtained is pure in thin-layer chromatography (TLC).

EXAMPLE 18

The PG-inhibitory effect of esters of the present invention on the gerbil colon are determined using the general technique described by Eakins, Miller & Karim (J. Pharm. Exp. Ther. 176:441, 1971). Gerbils (Meriones unguiculatus) of own breed, both sexes, weighing 50–80 g are used. The animal is stunned, colon ascendens immediately removed, and a 2–3 cm piece mounted in a 6 ml bath containing a modified de Jalon solution at 28°C and continously oxygenated. Contractions of the organ are registered either isotonically or isometrically. When testing the inhibitory effect of a compound this is added to the bath 2 min. before the addition of prostaglandin. The antagonist (esters of this invention) is usually dissolved in saline, but occasionally an organic solvent such as ethanol has to be included. Several concentrations of each antagonist are used. In this system prostaglandins $E_1$, $E_2$, $F_{1\alpha}$ and $F_{2\alpha}$ produce suitable contractions of the organ in the concentration range 1–50 ng/ml.

Results from these experiments give an approximation of the PG-inhibitory potency of the compounds. When more precise information about this is desired we use a more elaborate method involving the establishment of several PR dose-response curves in the presence of various concentrations of inhibitor. The method used is essentially the same as that described by Arunlakshana & Schild (Br. J. Pharm. 14:48, 1959). Other agonists, acetylcholine, 5-HT and bradykinin, are included in these experiments in order to determine the selectivity of the antagonism.

Esters of the present invention cause a dose-dependent inhibition of the responses of the gut preparation to either of the prostaglandins tested. The concentration of polyphloretin phosphate (PPP) required to produce a 50 percent reduction of the PG-induced contraction is 10–75 μg/ml, the antagonist-agonist ratio being in the order of 2000–4000. The corresponding concentration of sodium bis(4-(2-(2,4,6-trihydroxyphenyl)-2-oxoethyl)phenyl)phosphate is only about one tenth of that of PPP.

The sodium salt of diphenyl phosphate is without effect in concentrations 10 times as high as that of PPP.

In addition the results with other agonists than prostaglandins show that the antagonism is very selective, far higher concentrations than the prostaglandin-inhibitory ones having no influence on the contractions elicited by acetylcholine, 5-HT or bradykinin.

The selective inhibitory effects of the following compounds are found to be equal to or superior to that of PPP.

sodium bis(4-benzoyl-3-hydroxyphenyl) phosphate
sodium bis(4-(2,4,6-trimethoxybenzoyl)phenyl) phosphate
sodium bis(3-(2,4,6-trimethoxybenzoyl)phenyl) phosphate
sodium bis(4-benzoyl-3-carboxymethoxyphenyl) phosphate
sodium bis(4-(2,4,6-trihydroxybenzoyl)phenyl) phosphate
sodium bis(4-(2-(4-hydroxyphenyl)butyryl)phenyl) phosphate
sodium bis(4-(4-methoxyphenylacetyl)-3-hydroxyphenyl) phosphate
sodium bis(4-(4-methoxyphenylacetyl)-3-hydroxy-2-methyl)phenyl phosphate
sodium bis(4-(3-aminobenzoyl)phenyl)phosphate
sodium bis(4-(2-carboxybenzoyl)phenyl) phosphate
sodium bis(4-benzoyl-3-carboxymethylphenyl) phosphate
sodium bis(4-(3-fluorobenzoyl)-2,5-dimethylphenyl) phosphate
sodium bis(4-(2-carbomoylbenzoyl)phenyl)phosphate
sodium bis(4-(2,4-dimethylbenzoyl)-2,6-dimethoxyphenyl) phosphate
sodium bis(4-(4-trifluoromethylbenzoyl)phenyl) phosphate
sodium bis(4-(2-hydroxy-1-oxo-2-phenylethyl)-phenyl)phosphate
trisodium salt of bis(4-(2-(4-dihydroxyphosphinyloxyphenyl)butyryl)phenyl) hydrogen phosphate This example shows that the new compounds have utility as antagonists of various prostaglandins and also have the valuable property to exert these effects with high selectivity.

EXAMPLE 19

The inhibitory effect of esters of the present invention has been investigated on the prostaglandin-stimulated cortico sterone production by adrenals from male rats in vitro. The experiments were performed using adult Sprague-Dawley male rats weighing 200–250 g, which were housed 1 per cage under conditions of controlled lighting and temperature. Animal quarters were not entered during the 18 h preceding the experiment. The animals were sacrified by decapitation at 10 AM under conditions chosen to minimize disturbance of the animals. The adrenals were decapsulated and quartered and 8 adrenal quarters from different animals were distributed to 10 ml Erlenmeyer flasks containing 0.5 ml 0.9 percent saline and 2.0 ml Krebs-Ringer bicarbonate buffer, pH 7.4. The weight of the adrenal tissue in each flask was determined. The flasks were gassed with 95 percent $O_2$-5 percent $CO_2$ and preincubated at 37°C for 1 h with continous shaking. Following preincubation the media were decanted and discarded. One ml of Krebs-Ringer buffer, with or without the additions of prostaglandin $E_2$ ($PGE_2$) sodium bis(4-(2-(2,4,6-trihydroxyphenyl)-2-oxoethyl)-phenyl) phosphate (Leo 1463), (for details see below) was added to the flasks, which were then gassed with 95 percent $O_2$-5 percent $CO_2$ and kept at 37°C for 1 h with continous shaking. Following incubation, corticosterone levels were determined on 0.5 ml aliquots of the medium by the sulphuric acid fluorescence method.

In the first experiment (I) $PGE_2$ in a concentration of 1 µg/ml was added to the incubation medium containing the quartered adrenals. The result is shown in the Table and it can be seen that a highly significant increase in the corticosterone concentration is produced by $PGE_2$.

In the next experiment (II) different amounts of Leo 1463 to the incubation medium. The results reveal that when 0.25 and 1.0 mg of Leo 1463 were added to the incubation bath dose-related inhibition of the $PGE_2$-stimulated corticosterone production was seen.

When sodium bis(4-(2-(2,4,6-trihydroxyphenyl)-2-oxoethyl)phenyl) phosphate is investigated in the same experimental system, a 50 percent reduction of the lactate production is seen, when only 50–100 µg/ml of the compound is present in the preincubation medium. Thus, this compound is 5–10 times more active as a prostaglandin inhibitor than PPP in the present experimental system.

Prostaglandin-inhibiting activity of the same order is also seen when the following compound is tested:
sodium bis(4-(2,4,6-trihydroxybenzoyl)-phenyl)phosphate This example shows that the new compounds are useful to antagonize the effect of prostaglandins on the ovary, which is of importance for the regulation of the hormone secretion from this organ (Behrman, H. R. et al. Am. J. Physiol. 221 (1971) 189).

EXAMPLE 21

The in vivo action of esters of the present invention

Table

| Exp. No. | Group No. | Additions to incubation media | No. of observ. | Corticosterone production µg/100 mgx 1 h% | P |
|---|---|---|---|---|---|
| I | | Control | 4 | 3.7 ± 0.5 | <0.001 |
| | A | $PGE_2$ – 1 µg/ml<br>Leo 1463 – 250 µg/ml | 4<br>4 | 7.4 ± 0.3<br>3.9 ± 0.4 | |
| | B | $PGE_2$ – 1 µg/ml | 4 | 8.4 ± 0.5 | A/B <0.001 |
| II | C | $PGE_2$ – 1 µg/ml<br>Leo 1463 – 250 µg/ml | 4 | 6.3 ± 0.5 | B/C <0.05 |
| | D | $PGE_2$ – 1 µg/ml<br>Leo 1463 – 1 mg/ml | 4 | 3.2 ± 0.1 | B/D <0.001 |

X) Mean ± standard error

Prostaglandin inhibiting activity of the same order is also seen when the following compound is tested:
sodium bis(4-(2,4,6-trihydroxybenzoyl)-phenyl) phosphate
This example shows that the new compounds are useful to prevent the corticosteroid production in adrenals caused by prostaglandins.

EXAMPLE 20

The action of esters of the present invention on the prostaglandin-stimulated glycolysis of the prepubertal ovary is investigated. The method used has been described in detail by Perklev & Ahrén (Life Sciences Part I, 10:1387, 1971). In these experiments ovaries from prepubertal rats are removed and placed in Erlenmeyer flasks containing compounds of this invention dissolved in Krebs bicarbonate buffer. After that the ovaries have been preincubated during 60 min. at 37°C in this medium, they are blotted on filter paper and then washed for 2 min. in plain buffer. The ovaries are then transferred to a new incubation medium containing prostaglandins (PG) dissolved in Krebs bicarbonate buffer and incubated at 37°C for 2 hours with continuous shaking. The ovarian glycolysis is then determined by measuring the concentration of lactic acid in the incubation medium. When polypholoretin phosphate (PPP) is present in the preincubation medium in a concentration of 500 µg/ml, the subsequent ovarian lactic acid production produced by $PGE_1$ is reduced to about 50 percent, of that obtained with ovaries preincubated in plain buffer.

on the prostaglandin-stimulated glycolysis of the prepubertal ovary is investigated in the following way:

Prepubertal rats, 24–26 days old, of the Sprague-Dawley strain, are injected intraperitoneally (i.p.) with 1 ml saline containing 500 µg sodium bis(4-(2-(2,4,6-trihydroxyphenyl)-2-oxoethyl)phenyl) phosphate One hour later the animals are sacrificed by cervical fracture and the ovaries are removed and trimmed free of extraneous tissue. The ovaries are then transferred to an incubation bath containing prostaglandin $E_1$ ($PGE_1$; 0.4 µg/ml) dissolved in Krebs bicarbonate buffer and incubated at 37°C for 2 hours with continuous shaking. The ovarian glycolysis is then determined by measuring the concentration of lactic acid in the incubation medium. The details of the method have been described previously (Perklev, T. & Ahren, K., Life Sciences Part I, 10:1387, 1971). In ovaries of animals treated with the phosphoric acid ester mentioned above, the glycolysis is significantly reduced compared to that measured in ovaries injected with saline. The same reduction in ovarian glycolysis is also seen when the following compound is injected i.p. before the exposure of the ovaries to $PGE_1$ as described above:
sodium bis(4-(2,4,6-trihydroxybenzoyl)-phenyl)phosphate
This example shows that the new compounds exert the same effect as shown in the previous experiment also when they are injected into the animals.

EXAMPLE 22

The antagonism to Slow Reacting Substance (SRS)

is determined on the isolated guinea-pig ileum as described by Mathé & Strandberg (Acta physiol. scand. 82:460, 1971). Purified SRS is obtained from cat paws perfused with compound 48/80 (Strandberg & Uvnäs: Acta physiol. scand. 82:358, 1971). Sodium bis(4-(2-(2,4,6-trihydroxyphenyl)-2-oxoethyl)phenyl) phosphate was tested in this system in several concentrations.

In concentrations as low as 5 µg/ml, it inhibits contractions produced by SRS, but not by histamine and bradykinin, in a competitive manner, i.e. parallel shift of the dose-response curves and with no change in maximum contraction.

The sodium salt of diphenyl phosphate is found to be without effect.

The following compounds of this invention are also found to inhibit SRS:
    sodium bis(4-(2,4,6-trihydroxybenzoyl)-phenyl)phosphate
    sodium bis(4-benzoyl-3-hydroxyphenyl) phosphate
    sodium bis(4-(2-carboxybenzoyl)phenyl) phosphate
    trisodium bis(4-(2-(4-dihydroxyphosphinyloxyphenyl)butyryl)phenyl) phosphate From this example it is obvious that the new compounds also are useful as antagonists of SRS, a compound chemically related to the prostaglandins and known to be one of the substances which provokes bronchial asthma (for references see Brocklehurst, W. E., Progr. Allergy 6(1962) 539).

EXAMPLE 23

The effects of esters of the present invention on the anaphylactic reaction in guinea-pigs have been investigated using the isolated perfused guinea-pig lung preparation as described by Bhattachraya & Delaunois (Arch. Int. Pharmacodyn. 101:495, 1955). Guinea-pigs weighing about 300 g are sensitized with egg albumin according to Fredholm & Strandberg (1969). After the appropriate sensitization period the lungs are removed and mounted in a moist, thermostated chamber. The trachea and A. pulmonalis are cannulated. The arterial cannula is connected to a perfusion fluid reservoir containing Tyrode solution buffered with 10 percent Sörensen phosphate buffer. The tracheal cannula is connected with tubing to a carbogen gas supply delivering a constant amount per time unit. The perfusion pressure is measured in a side arm of the tubing with a "Mercury" transducer connected to an Ultralette UV-recorder. When antigen (egg albumin), 0.1 - 1.0 µg, is injected via the arterial cannula, a bronchoconstriction, indicated by an increase in the perfusion pressure, is elicited. When sodium bis(4-(2-(2,4,6-trihydroxyphenyl)-2-oxoethyl)phenyl) phosphate, 4-20 µg/ml, is incorporated in the Tyrode solution this anaphylactic bronchoconstriction is abolished or markedly reduced. The sodium salt of diphenyl phosphate completely lacked such an effect even when tested in the concentration 100 µg/ml.

Similar effects in a dose of about 5-20 µg/ml are also obtained with the following compounds:
    sodium bis(4-(2,4,6-trihydroxybenzoyl)-phenyl) phosphate
    sodium bis(4-benzoyl-3-hydroxyphenyl) phosphate
    sodium bis(4-(2-carboxybenzoyl)phenyl) phosphate This example shows that the new compounds have utility in preventing an anaphylactic reaction.

EXAMPLE 24

Prepubertal rat ovaries are incubated with luteinizing hormone (LH) essentially according to Perklev and Ahrén (Life Sciences Part I 10 (1971) 1387), one modification being the inclusion of theophylline into the Krebs-Ringer medium in order to inhibit the breakdown of cyclic AMP. After incubation, the ovaries are homogenized in trichloroacetic acid and cyclic AMP is determined in this extract after removal of the acid. Cyclic AMP is also determined in the incubation medium.

The method for the assay is modelled after that of Gilman (PROC. NATL. ACAD. SCI. U.S. 67 (1970) 305). The extract or the medium containing cyclic AMP is incubated with a protein kinase (prepared from rabbit skeletal muscle) in the presence of a known amount of tritium labelled cyclic AMP. The amount of labelled cyclic AMP bound to the protein kinase is proportional to the amount unlabelled cyclic AMP to be assayed, and is determined by liquid scintillation counting after isolating the kinase cyclic AMP complex by Millipore filtration.

When incubation of the prepubertal ovaries was carried out in the presence of sodium bis(4-(2,4,6-trihydroxyphenyl)-2-oxoethyl)phenyl) phosphate the $ID_{50}$ (concentration of inhibitor resulting in 50 percent inhibition of the formation of cyclic AMP in the ovary as well as in the incubation medium) was $1.5 \times 10^{-5}$ M.

The following phosphoric acid esters have also been found to exert an inhibiting activity of the same order, when tested in the same in vitro system:
    sodium bis(4-(2,4,6-trihydroxybenzoyl)-phenyl) phosphate
    sodium bis(4-benzoyl-3-hydroxyphenyl) phosphate
    sodium bis(4-(2-carboxybenzoyl)phenyl)phosphate
    trisodium bis(4-(2-(4-dihydroxyphosphinyloxyphenyl)butyryl)phenyl) phosphate From this example it is obvious that the new compounds are useful as inhibitors of the formation of cyclic-AMP and therefore will improve pathological conditions caused by an excessive formation of this compound.

EXAMPLE 25

This example illustrates the smooth muscle stimulatory effect of esters of this invention on the gerbil colon in vivo.

The experiments are performed with mongolian gerbils, anesthetized with pentobarbital, 50 mg/kg. The ascending colon is exposed and carefully stretched between silk thread loops and a strain-gauge transducer.

After a stable base-line has been established an ester of this invention,
    sodium bis(4-(2-(2,4,6-trihydroxyphenyl)-2-oxoethyl)phenyl) phosphate (Leo 1463) is infused i.v.

In doses from 40 mg/kg this treatment causes the gut to respond with a series of contractions. Sodium diphenyl phosphate causes no effect at all in doses up to 400 mg/kg.

When Leo 1463, in the concentration of 1 mg/ml, is incorporated in the buffer solution superfusing the gut, this reacts with an increase in tone, i.e. a contraction.

Similar effects are also obtained with the following compounds:
    sodium bis(4-benzoyl-3-hydroxyphenyl) phosphate
    sodium bis(4-(2-carboxybenzoyl)phenyl)phosphate
    trisodium bis(4-(2-(4-dihydroxyphosphinyloxyphenyl)butyryl)phenyl) phosphate This example shows the usefulness of the new compounds in stimulation of smooth muscles.

Example 26

The effects of esters of the present invention on bronchial smooth muscle have been investigated using an isolated perfused guinea-pig lung preparation according to Thattacharya & Delaunois (Arch. Int. Pharmacodyn. 101:495, 1955). The lungs from guinea-pigs weighing 300–400 g are removed, and the trachea and A. pulmonalis cannulated. The arterial cannula is connected to a perfusion fluid reservoir containing Tyrode solution buffered with a 10 percent Sörensen phosphate buffer. The tracheal cannula is connected with tubing to a carbogen gas supply delivering a constant amount per time unit. The perfusion pressure is measured in a side arm of the tubing with a "Mercury" transducer connected to an Ultralette UV-recorder. The compounds are injected via the arterial cannula, close to the entrance of A. pulmonalis in the lung. In this type of experiments trisodium (bis (4-(2(4-dihydroxyphosphinyloxyphenyl)butyryl)phenyl) phosphate phosphate showed a broncho-constricting effect, when administered in a dose of about 0.5 mg and upwards. The sodium salt of diphenyl phosphate completely lacked such an effect even when tested in the dose of 12.8 mg.

Similar effects in a dose of about 0.5–2.0 mg are also obtained with the following compounds.

sodium bis(4-(2-(2,4,6-trihydroxyphenyl)-2-oxoethyl)phenyl) phosphate
sodium bis (4-(2-carboxybenzoyl)phenyl) phosphate
sodium bis (4-benzoyl-3-carboxymethylphenyl) phosphate
sodium bis (4-(3-aminobenzoyl)phenyl) phosphate This example shows the usefulness of the new compounds in stimulation of smooth muscles.

EXAMPLE 27

Effects of esters of the present invention are also studied on a rat uterus preparation, using an established technique (Staff of the Department of Pharmacology, University of Edinburgh: Pharmacological Experiments on Isolated Preparations, E & S Livingstone Ltd, Edinburgh and London 1968). In these experiments uterine horns from diethylstilbestrol-treated rats are suspended in a 6 ml bath containing modified de Jalon solution, kept at 28°C and gassed with air. When sodium bis(4-(2,4,6-trihydroxyphenyl)-2-oxoethyl)phenyl) phosphate is added in the concentration range 2–10 μg/ml a contraction is obtained demonstrating the smooth muscle stimulating action of this compound.

Similar effects are also obtained with the following compounds:

sodium bis(4-(2carboxybenzoyl)phenyl) phosphate
sodium bis(4-benzoyl-3-carboxymethoxyphenyl) phosphate
sodium bis(4-(3aminobenzoyl)phenyl) phosphate This example shows the usefulness of the new compounds in stimulation of smooth muscles.

EXAMPLE 28

Manufacturing Process for tablets à 25 mg.

Model batch of 1000 tablets.

| | | | |
|---|---|---|---|
| I | Sodium bis(4-(2,4,6-trimethoxybenzoyl)phenyl) phosphate mesh 70 | 25.0 | g |
| | Lactosum, Ph.Nord. | 210 | g |
| | Amylum maidis, Ph.Nord. | 75 | g |
| II | Kollidon 25, B.A.S.F. | 3.5 | g |
| | Aqua purificata q.s. | | |
| III | Talcum, Ph.Nord. | 15 | g |
| | Magnesii stearas, Ph.Nord. | 1.5 | g |
| | Weight of 1000 tablets: | 330 | g |
| | Weight of 1 tablet: | 330 | mg |

Punch: 10.5 mm round, flat, scored, bevel-edged.

Mix the screened substances I thoroughly and then moisten with II, whereupon it is granulated through a stainless sieve no. 10 (mesh 25). Dry the granulate in an oven at a maximum temperature of 40°C, then repeat sieving through sieve no. 10. Add the substances under III and mix thoroughly. Punch tablets with a gross weight of about 330 mg.

EXAMPLE 29

Manufacturing Process for tablets à 25 mg.

Model batch of 1000 tablets.

| | | | |
|---|---|---|---|
| I | Sodium bis(4-(2-(2,4,6-trihydroxyphenyl)-2-oxoethyl)phenyl)phosphate mesh 70 | 25.0 | g |
| | Avicel, FMC Corporation, USA | 76 | g |
| II | Amylum maidis, Ph.Nord. | 76 | g |
| | Calcii phosphas, Ph.Nord | 76 | g |
| III | Talcum, Ph.Nord | 15 | g |
| | Magnesii stearas, Ph.Nord. | 2 | g |
| | Weight of 1000 tablets | 270 | g |
| | Weight of 1 tablet: | 270 | mg |

Punch: 9.0 round, normal concave.

Mix I by gradual stages with II. Add the substances under III and mix thoroughly. Punch tablets with a gross weight of about 270 mg.

EXAMPLE 30

Oral suspension 5 mg/ml.

| | |
|---|---|
| Sodium bis(4-(2,4,6-trimethoxybenzoyl)phenyl) phosphate | 5 mg |
| Sorbitol | 600 mg |
| Ascorbic acid | 100 mg |
| Flavouring compound | q.s. |
| Colour | q.s. |
| Water to make | 1 ml |

EXAMPLE 31

Vagitoria 25 mg.

| | |
|---|---|
| Sodium bis(4-(2,4,6-trihydroxybenzoyl)phenyl) phosphate | 25 mg |
| Cacao butter | q.s. |

EXAMPLE 32

Ointment 2 %

| | | |
|---|---|---|
| Sodium bis(2,4,6-trihydroxybenzoyl)phenyl) phosphate | 2 | g |
| Triethanolamine | 1 | g |
| Glycerol | 7 | g |
| Cetanol | 2.5 | g |
| Lanoline | 2.5 | g |
| Stearic acid | 20 | g |
| Sorbitan monooleate | 0.5 | g |
| Sodium hydroxide | 0.2 | g |

EXAMPLE 32 — Continued
Ointment 2 %

| | | |
|---|---|---|
| Methyl paraben | 0.3 | g |
| Propyl paraben | 0.1 | g |
| Ethanol | 0.9 | g |
| Water to make | 100 | g |

EXAMPLE 33
Eye-drops 2 %

| | |
|---|---|
| Sodium bis(4-(2-(2,4,6-trihydroxyphenyl)-2-oxoethyl)phenyl) phosphate | 20 mg |
| Boric acid | 10 mg |
| Cetylpyridinium chloride | 25 μg |
| Distilled water to make | 1 ml |

EXAMPLE 34
Aerosol for inhalation

| | |
|---|---|
| Sodium bis(4-(2-(2,4,6-trihydroxyphenyl)-2-oxoethyl)phenyl) phosphate | 1 % |
| Isopropyl myristate | 1 % |
| Dichlorodifluoromethane | 39 % |
| Dichlorotetrafluoroethane | 59 % |
| Filled in a container with metered valve. Each dose gives | |

EXAMPLE 35
Suspension for injection 20 mg/ml.

| | |
|---|---|
| Sodium bis(3-(2,4,6-trimethoxybenzoyl)-phenyl)phosphate | 20 mg |
| Sodium chloride | 8 mg |
| Carboxy methylcellulose | 1 mg |
| Benzyl alcohol | 1 mg |
| Distilled water to make | 1 ml |

EXAMPLE 36
Injectable solution 20 mg/ml.

| | | |
|---|---|---|
| Sodium bis(4-(2-(2,4,6-trihydroxyphenyl-2-oxoethyl)phenyl) phosphate | 20 | mg |
| Ascorbic acid | 1 | mg |
| Sodium bisulfite | 1 | mg |
| Sodium chloride | 6 | mg |
| Methyl paraben | 0.7 | mg |
| Propyl paraben | 0.3 | mg |
| Distilled water to make | 1 | ml |

EXAMPLE 37
Injectable solution 25 mg/ml.

| | |
|---|---|
| Sodium bis(4-(2,4-dimethylbenzoyl)-2,6-dimethoxyphenyl) phosphate | 25 mg |
| Benzyl alcohol | 50 mg |
| Peanut oil to make | 1 ml |

EXAMPLE 38

40 mg Sterile powder to be dissolved in water for injection.

| | |
|---|---|
| Sodium bis(4-(2,4,6-trihydroxybenzoyl)-phenyl)phosphate | 40 mg |
| Sodium chloride | 4 mg |
| Methyl paraben | 0.7 mg |
| Propyl paraben | 0.3 mg |

The substances are dissolved in distilled water.
The solution is dispensed in vials and freeze-dried.

The above examples 28-38 to compositions are merely representative with regard to the active ingredients exemplified. It is to be understood that other compounds disclosed in the foregoing examples 1-16 may well be substituted for the active ingredients illustrated in the above examples Also, it is to be noted that two or more compounds of the invention may be used in combination in the compositions illustrated, and also, if desired, in combination with other pharmacologically active agents.

Various modifications and equivalents will be apparent to one skilled in the art and may be made in the compounds, compositions and methods of the present invention without departing from the spirit or scope thereof, and it is therefore to be understood that the invention is not to be limited to the specific examples and embodiments disclosed herein.

We claim:

1. A novel secondary phosphoric acid ester compound having the general formula

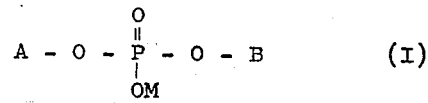

wherein M is selected from the group consisting of hydrogen and a pharmaceutically acceptable inorganic and organic cation; and wherein A and B, independent of each other, are

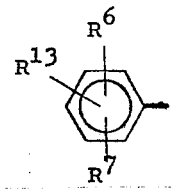

wherein one and only one of substituents substitutents $R^6$, $R^7$, and $R^{13}$ always represents a group R, located in any of the meta and para positions relative to the phosphoric acid ester group, the group R having the formula

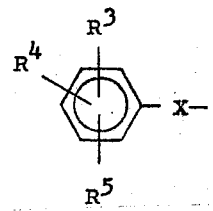

wherein X is selected from the group consisting of

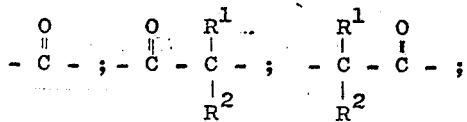

wherein $R^1$ and $R^2$ are selected from the group consisting of hydrogen; lower alkyl; and lower alkenyl; wherein if $R^1$ is hydrogen $R^2$ may further be selected from the group consisting of cyclopentyl; cyclohexyl; phenyl; and phenyl substituted in m- or p-position by one substituent selected from the group consisting of lower alkyl, lower alkoxy, —F, —Cl, —Br, and —$CF_3$; wherein $R^3$, $R^4$, $R^5$, $R^6$, $R^7$, and $R^{13}$ above are selected from the group consisting of hydrogen; lower alkyl; lower alkenyl; lower alkoxy; hydroxy; —O—CO—$R^{14}$; —F; —Cl; —Br; and —$CF_3$; and wherein $R^{14}$ is lower alkyl.

2. A compound according to claim 1, wherein B is the same as A; wherein at least one of the substituents $R^3$, $R^4$, $R^5$, $R^6$, $R^7$, and $R^{13}$ is hydrogen; and wherein at least one of the substituents $R^3$, $R^4$, $R^5$, $R^6$, $R^7$, and $R^{13}$, in addition to one being R, is different from hydrogen, A and R having the meaning given in claim 1.

3. A compound according to claim 2, wherein one of the substituents $R^1$ and $R^2$, if present in X, is hydrogen and the other one is selected from the group consisting of hydrogen, lower alkyl, and lower alkenyl; X having the meaning given in claim 1.

4. A compound according to claim 2, wherein X is selected from the group consisting of

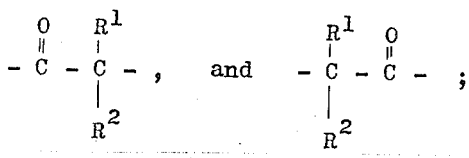

wherein $R^1$ is hydrogen and $R^2$ is selected from the group consisting of phenyl, and substituted phenyl; (having the meaning given in claim 1).

5. A compound according to claim 4, wherein the substituents $R^3$, $R^4$, $R^5$, $R^6$, $R^7$, and $R^{13}$ except the one being R, are selected from the group consisting of hydrogen, lower alkyl, lower alkoxy, hydroxy, $-O-CO-R^{14}$, $-F$, $-Cl$, $-Br$, and $-CF_3$; R, $R^{14}$ and M having the meaning given in claim 1.

6. A compound according to claim 3, wherein the substituent R is located in m-position to the secondary phosphoric acid ester group; and wherein the substituents $R^3$, $R^4$, $R^5$, $R^6$, $R^7$, and $R^{13}$ except the one being R, are selected from the group consisting of hydrogen, lower alkyl, lower alkoxy, hydroxy, $-O-CO-R^{14}$, $-F$, $-Cl$, $-Br$, and $-CF_3$; R, $R^{14}$ and M having the meaning given in claim 1.

7. A compound according to claim 3, wherein the substituent R is located in p-position to the secondary phosphoric acid ester group; and wherein the substituents $R^3$, $R^4$, $R^5$, $R^6$, $R^7$, and $R^{13}$ except the one being R, are selected from the group consisting of hydrogen, lower alkyl, lower alkoxy, hydroxy, $-O-CO-R^{14}$, $-F$, $-Cl$, $-Br$, and $-CF_3$; R, $R^{14}$ and M having the meaning given in claim 1.

8. A compound according to claim 6, wherein at least two of the substituents $R^3$, $R^4$, $R^5$, $R^6$, $R^7$, and $R^{13}$, except the one being R, are selected from the group consisting of lower alkyl, lower alkoxy, hydroxy, and $-O-CO-R^{14}$; the remaining ones being hydrogen, R and $R^{14}$ having the meaning given in claim 1.

9. A compound according to claim 7, wherein at least two of the substituents $R^3$, $R^4$, $R^5$, $R^6$, $R^7$ and $R^{13}$, except the one being R, are selected from the group consisting of lower alkyl, lower alkoxy, hydroxy, and $-O-CO-R^{14}$; the remaining ones being hydrogen; R and $R^{14}$ having the meaning given in claim 1.

10. A compound according to claim 9, wherein the group X is

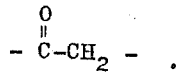

11. A compound according to claim 9, wherein the group X is selected from the group consisting of

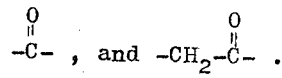

12. A compound according to claim 1, wherein M is selected from the group consisting of calcium; potassium; sodium; diethanolamine; dimethylaminoethanol; N-methylglucamine; and morpholine.

13. A compound according to claim 5 selected from the group consisting of
sodium bis(4-(1-oxo-2,2-diphenylethyl)phenyl) phosphate
sodium bis(4- bis(2-(4-chlorophenyl) acetyl)-phenyl) phosphate 14. A compound according to claim 7 selected from the group consisting of
sodium bis(4-benzoyl-3-hydroxyphenyl) phosphate
sodium bis(4-(2-(4-hydroxyphenyl)butyryl)phenyl) phosphate
sodium bis(4-(3-fluorobenzoyl)-2,5-dimethylphenyl) phosphate
sodium bis(4-(4-trifluoromethylbenzoyl)phenyl) phosphate
sodium bis(4-(2-butoxycarbonylbenzoyl)phenyl) phosphate 15. A compound according to claim 8 selected from the group consisting of
sodium bis(3-(2,4,6-trimethoxybenzoyl)phenyl) phosphate
sodium bis(3-(2,4,5-trimethylbenzoyl)phenyl) phosphate 16. A compound according to claim 10 selected from the group consisting of
sodium bis(4-(2,4,6-trimethoxybenzoylmethyl)phenyl) phosphate
sodium bis(4-(2,4,6-trihydroxyphenyl)-2-oxoethyl)-phenyl) phosphate
sodium bis(4(2-(2,4,6-triacetoxyphenyl)-2-oxoethyl)phenyl) phosphate.

17. A compound according to claim 11 selected from the group consisting of
sodium bis(4-benzoyl-3,5-dimethoxyphenyl) phosphate
sodium bis(4-(2,4-dimethoxybenzoyl)phenyl) phosphate
sodium bis(4-(2,4,6-trimethoxybenzoyl)phenyl) phosphate
sodium bis(4-(4-methoxybenzoyl)-3,5-dimethoxyphenyl) phosphate
sodium bis(4-(4-methoxyphenylacetyl)-3-hydroxyphenyl) phosphate
sodium bis(4-(4-methoxyphenylacetyl)-3-hydroxy-2-methyl)phenyl) phosphate
sodium bis(4-(2,4,6-trimethylbenzoyl)phenyl) phosphate
sodium bis(4-benzoyl-2,6,-dimethylphenyl) phosphate
sodium bis(4-(3,5-dimethylbenzoyl)-2,6-dimethylphenyl) phosphate
sodium bis(4-(2,4-dimethylbenzoyl)-2,6-dimethoxyphenyl) phosphate
sodium bis(4-(3,5-dimethoxybenzoyl)-2,6-dimethylphenyl) phosphate
sodium bis(4-(2,4,6-trihydroxybenzoyl)-phenyl) phosphate 18. A compound of claim 1 which is sodium bis(4-(2-(2,4,6-trihydroxyphenyl)-2-oxoethyl)phenyl)phosphate.

* * * * *

UNITED STATES PATENT OFFICE
CERTIFICATE OF CORRECTION

Patent No. 3,869,527     Dated March 4, 1975

Inventor(s) Bertil Högberg et al.

It is certified that error appears in the above-identified patent and that said Letters Patent are hereby corrected as shown below:

Col. 3, line 20: "ethio-" -- etio- --

Col. 25, line 2: "with solidifies" -- which solidifies --

Col. 29, line 64: "polypholoretin" -- polyphloretin --

Col. 31, line 36: "Bhattachraya" -- Bhattacharya --

Col. 33, line 21: "(4-(2(4-" -- (4-(2-(4- --

Col. 33, line 56: "(2carboxybenzoyl)" -- (2-carboxybenzoyl) --

Col. 33, line 59: "(3aminobenzoyl)" -- (3-aminobenzoyl) --

Col. 37, lines 26, 34, and 42 (3 occurrences) - insert a comma (,) before "except the one..."

Col. 38, line 30: "(3-(2,4,5-" -- (3-(2,4,6-

Col. 38, line 36: "bis(4-(2,4,6-" -- bis(4-(2-(2,4,6- --

Col. 38, line 38: "bis(4(2-(" -- bis(4-(2-( --

Signed and Sealed this second Day of September 1975

[SEAL]

Attest:

RUTH C. MASON
Attesting Officer

C. MARSHALL DANN
Commissioner of Patents and Trademarks